US011863406B2

(12) United States Patent
Johnson et al.

(10) Patent No.: US 11,863,406 B2
(45) Date of Patent: Jan. 2, 2024

(54) NETWORKED PROGRAMMABLE LOGIC SERVICE PROVIDER

(71) Applicant: Amazon Technologies, Inc., Seattle, WA (US)

(72) Inventors: Robert Michael Johnson, Austin, TX (US); Nafea Bshara, San Jose, CA (US); Matthew Shawn Wilson, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/466,944

(22) Filed: Sep. 3, 2021

(65) Prior Publication Data
US 2021/0399958 A1 Dec. 23, 2021

Related U.S. Application Data

(63) Continuation of application No. 15/354,765, filed on Nov. 17, 2016, now Pat. No. 11,115,293.

(51) Int. Cl.
*H04L 12/24* (2006.01)
*G06F 9/50* (2006.01)
(Continued)

(52) U.S. Cl.
CPC ............ *H04L 41/5054* (2013.01); *G06F 9/50* (2013.01); *G06F 15/7871* (2013.01); *H04L 41/5096* (2013.01)

(58) Field of Classification Search
CPC ... H04L 41/5054; H04L 41/5096; G06F 9/50; G06F 15/7871
See application file for complete search history.

(56) References Cited

U.S. PATENT DOCUMENTS

| 6,438,737 B1 | 8/2002 | Morelli et al. |
| 6,678,646 B1 | 1/2004 | McConnell et al. |

(Continued)

FOREIGN PATENT DOCUMENTS

| CN | 104699508 A | 6/2015 |
| CN | 105493045 A | 4/2016 |

OTHER PUBLICATIONS

Heiner et al., "FPGA Partial Reconfiguration via Configuration Scrubbing," 2009 International Conference on Field Programmable Logic and Applications, Aug. 2009, pp. 99-104.
(Continued)

*Primary Examiner* — Kostas J Katsikis
(74) *Attorney, Agent, or Firm* — Klarquist Sparkman, LLP

(57) ABSTRACT

Methods and apparatus are disclosed for programming reconfigurable logic devices such as FPGAs in a networked server environment. In one example, a system hosting a network service providing field programmable gate array (FPGA) services includes a network service provider configured to receive a request to implement application logic in a plurality of FPGAs, allocate a computing instance comprising the FPGAs in responses to receiving the request, produce configuration information for programming the FPGAs, and send the configuration information to an allocated computing instance. The system further includes a computing host that is allocated by the network service provider as a computing instance which includes memory, processors configured to execute computer-executable instructions stored in the memory, and the programmed FPGAs.

23 Claims, 14 Drawing Sheets

(51) Int. Cl.
*G06F 15/78* (2006.01)
*H04L 41/5054* (2022.01)
*H04L 41/50* (2022.01)

(56) References Cited

U.S. PATENT DOCUMENTS

| | | |
|---|---|---|
| 7,581,117 B1 | 8/2009 | Irving et al. |
| 8,635,675 B2 | 1/2014 | Kruglick |
| 8,645,712 B1 | 2/2014 | Langhammer |
| 10,223,014 B1 | 3/2019 | Atsatt et al. |
| 10,540,506 B2 | 1/2020 | Hoppert |
| 10,642,492 B2 | 5/2020 | Davis et al. |
| 10,747,565 B2 | 8/2020 | Johnson et al. |
| 10,963,414 B2 | 3/2021 | Atta et al. |
| 11,347,556 B2 | 5/2022 | Sandstrom |
| 11,385,934 B2 | 7/2022 | Sandstrom |
| 2001/0037458 A1 | 11/2001 | Kean |
| 2002/0199110 A1 | 12/2002 | Kean |
| 2009/0157457 A1 | 6/2009 | Huuhtanen et al. |
| 2010/0174865 A1 | 7/2010 | Koester |
| 2012/0047371 A1 | 2/2012 | Woodall |
| 2013/0198459 A1 | 8/2013 | Joshi et al. |
| 2017/0264680 A1 | 9/2017 | Palermo et al. |
| 2017/0315813 A1* | 11/2017 | Smith ............. G06F 15/7867 |
| 2018/0089132 A1* | 3/2018 | Atta ............... G06F 15/7871 |
| 2018/0139110 A1 | 5/2018 | Johnson et al. |
| 2018/0165455 A1 | 6/2018 | Liguori et al. |
| 2018/0302281 A1 | 10/2018 | Khan et al. |
| 2019/0036713 A1 | 1/2019 | Slik |
| 2019/0065757 A1 | 2/2019 | Graf et al. |
| 2019/0108295 A1 | 4/2019 | Atta |
| 2019/0199692 A1 | 6/2019 | Atta et al. |
| 2020/0167506 A1 | 5/2020 | Iyer et al. |
| 2020/0228388 A1 | 7/2020 | Schulz et al. |
| 2020/0349310 A1 | 11/2020 | Atta |
| 2021/0012035 A1 | 1/2021 | Wei et al. |
| 2021/0111863 A1 | 4/2021 | Trivedi et al. |
| 2021/0117246 A1 | 4/2021 | Lal et al. |
| 2021/0117556 A1 | 4/2021 | Graf et al. |
| 2021/0326503 A1 | 10/2021 | Atta |
| 2022/0060454 A1 | 2/2022 | Atta et al. |

OTHER PUBLICATIONS

Heiner et al., "Fault Tolerant ICAP Controller for High-Reliable Internal Scrubbing," 2008 IEEE Aerospace Conference, Mar. 2008, pp. 1-10.

* cited by examiner

NETWORKED PROGRAMMABLE LOGIC SERVICE PROVIDER

CROSS REFERENCE TO RELATED APPLICATIONS

This is a Continuation of U.S. patent application Ser. No. 15/354,765, filed Nov. 17, 2016, which application is hereby incorporated by reference in its entirety.

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Some computations can be accelerated through the use of a co-processor, including accelerators implemented with reconfigurable logic (e.g., in a Field Programmable Gate Array (FPGA). FPGA developers typically connect a local host computer with a specialized interface to external pins of a local FPGA. Providing such accelerators in a cloud computing environment, which may lack specialized hardware and security features, thus presents ample opportunity for improvement.

DETAILED DESCRIPTION

Figure 1:
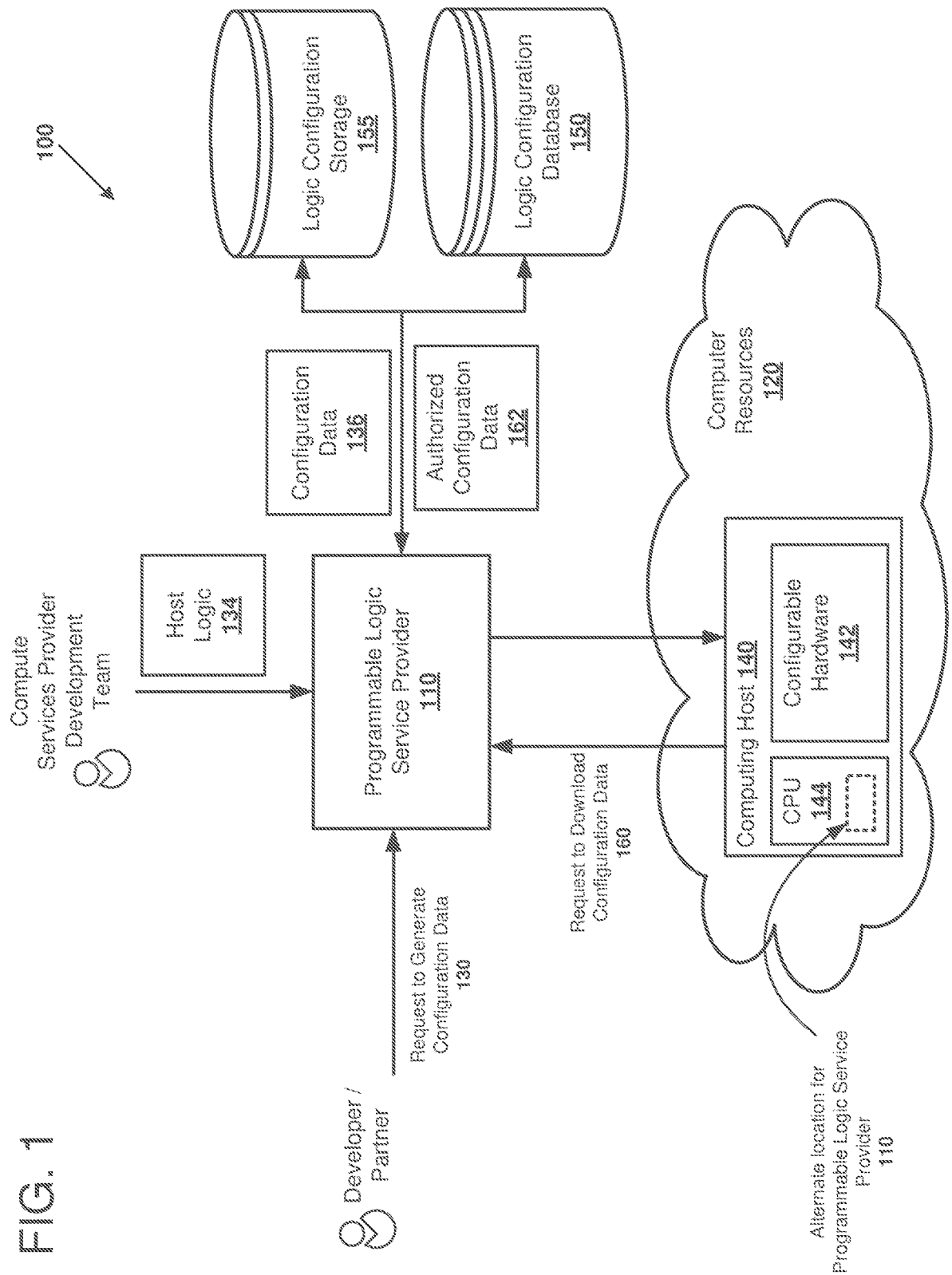
FIG. 1 is a system diagram showing an example of a system including a programmable logic service provider, as can be implemented in certain examples of the disclosed technology.

Specialized computing resources can be provided within a set of reusable general computing resources by configuring a server computer including a configurable logic platform (such as by providing a server computer with an add-in card including a field-programmable gate array (FPGA)) as a choice among the general computing resources. Configurable logic is hardware that can be programmed or configured to perform a logic function that is specified by configuration data that is applied to the configurable logic. For example, a user of the computing resources can provide a specification (e.g., written in a hardware description language (e.g., Verilog, SystemVerilog, and/or VHDL) or other language (e.g., C, C++, and/or SystemC), in a netlist generated with a schematic capture application, or in a netlist generated by a script) for configuring the configurable logic. The configurable logic can be configured according to the specification, and the configured logic can be used to perform a task for the user. However, allowing a user access to low-level hardware of the computing facility can potentially introduce security and privacy issues within the computing facility.

A programmable logic service provider is disclosed that operates a programmable logic service for authorizing and mapping customer requests for virtual machines to compute instances having reconfigurable logic device resources. The programmable logic service provider controls access to configuration data, including configuration data provided by third parties. The programmable logic service can be operated as a web-based service, for example a web-based service hosted in a cloud that maps user requests received via a computer network to compute instances comprising reconfigurable logic resources. In some examples, a programmable logic service is implemented on a different physical server than the computing host providing the allocated computing instance with the reconfigurable logic devices. In other examples, the programmable logic service provider is hosted on the same computing host. In some examples, the programmable logic service uses an identifier contained in a request to authenticate the request and produce configuration information from a networked database or networked storage using the identifier. In some examples, the indicator indicates a machine image used by the compute instance. In some examples, the indicator indicates a product code for a machine image in a software application marketplace. In some examples, the indicator identifies a virtual instance of the compute host's virtual instance (e.g., by indicating a virtual CPU ID or MAC address assigned to the virtual instance). In some examples, the indicator identifies a physical instance of the compute host's physical instance (e.g., by indicating an actual CPU ID or MAC address assigned to the virtual instance).

In some examples, the provider allocates the computing instance prior to receiving a request to implement application logic with reconfigurable hardware. In some examples, the provider is configured to allocate the computing instance with the application logic prior to initiating execution of the instance. In some examples, the compute instance is launched prior to producing the configuration data. In other examples, configuration data is produced prior to launching, and the launching action includes programming reconfigurable logic resources with the produced configuration data prior to providing the compute instance to the requester, for example, a user. In some examples, the computing instance can further reprogram a portion, but not all, of the reconfigurable logic device coupled to the computing host.

As described herein, a compute services facility can include a variety of computing resources, where one type of the computing resources can include a server computer (alternatively dubbed a host computer) comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. For example, the hardware accelerator can be accessible via a local interconnect, such as a Peripheral Component Interconnect Express (PCI-Express or PCIe) or an IEEE 802.3 (Ethernet) connection, of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

A compute services provider can manage the computing resources using software services, such as a programmable logic service provider, to manage the configuration and operation of the configurable hardware. As one example, the compute service provider can execute a logic repository service for ingesting a hardware or logic design of a user, generating validated configuration data for configuring the configurable logic platform based on the logic design of the user, and downloading the validated configuration data in response to a request to configure an instance of the configurable logic platform. The configuration data can include data for creating debugging resources on the configurable logic platform, allowing for viewing of signal values, triggers that indicate the occurrence of event, performance counters, and other suitable debugging technology for monitoring reconfigurable logic devices. The download request can be from the user that developed the logic design or from a user that has acquired a license to use the logic design. Thus, logic designs can be created by the programmable logic service provider, a user, or a third party that is separate from the user or the programmable logic service provider. For example, a marketplace of accelerator intellectual property (IP) can be provided to the users of the compute services provider, and the users can potentially increase the speed of their applications by selecting an accelerator from the marketplace.

FIG. 1 is a system diagram showing an example of a system 100 including a programmable logic service provider 110 that provides a configuration and management interface for accessing reconfigurable hardware resources 120. For example, the programmable logic service provider 110 can be used for managing access and deployment of configuration data to the configurable compute resources 120 when the resources are deployed.

The programmable logic service provider 110 can be a network-accessible service, such as a web service. Web services are commonly used in cloud computing. A web service is a software function provided at a network address over the Internet, cloud, or another network. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be accessed via a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The programmable logic service provider 110 can receive an API request 130 to generate configuration data for a configurable hardware platform, such as configurable hardware 142 of a server computer 140. Typically, the configurable hardware 142 includes reprogrammable logic devices, such as Field Programmable Gate Arrays (FPGAs), configurable programmable logic devices (CPLDs), programmable logic devices (PLDs), and programmable memory resources (e.g., electrically erasable programmable read only memory (EEPROM) or flash memory). In some examples, some or all of the configurable hardware is one-time programmable. In some examples, functionality for the programmable logic service provider 110 is implemented in whole or in part using the server computer 140, while in other examples, the functionality is implemented with computer resources separate from the server computer. In some examples, one instance of a programmable logic service provider can manage configurable hardware resources on a number of different physical and/or virtual hosts. In some examples, the programmable logic service provider 110 provides domain logic or otherwise applies rules for instantiating, operating, and terminating compute instances. For example, the domain logic may restrict access to all or a portion of a compute instance, including all or a portion of reconfigurable logic resources, until a financial transaction is processed. For example, a developer/partner may be required to purchase or lease a compute instance, or aspects of the compute instance, before or during operation of the compute instance. In some examples, the domain logic may restrict access based on attributes of the requester, such as identity of an associate organization, geographic location, or whether the requester has been sufficiently authenticated and/or authorized.

The API request 130 can be originated by a developer or partner user of the programmable logic service provider. The request 130 can include fields for specifying data and/or metadata about the logic design, the configurable hardware platform, user information, access privileges, production status, and various additional fields for describing information about the inputs, outputs, and users of the programmable logic service provider 110. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying application logic for implementation on the configurable hardware platform. The hardware design can be specified using source code files (e.g., hardware description language files written in a language such as SystemC, SystemVerilog, or VHDL) and/or references to configuration data including bitstream files used to program reconfigurable logic resources. Host logic, which will be used to control operation of the application logic when programmed into the configurable hardware, is received from, for example, a programmable logic service provider development team. A specification of the application logic and/or of the host logic can be a collection of files, such as source code, a netlist generated by a logic synthesis tool, and/or placed and routed logic gates generated by a place and route tool. The source code can include code written in a hardware description language (HDL), a register transfer logic (RTL) language, or a high-level language such as Open Computing Language (OpenCL) or C.

The compute resources 120 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example software resources can include different operating systems, application programs, and drivers. One example instance type can comprise the server computer 140 including a central processing unit (CPU) 144 in communication with the configurable hardware 142. The configurable hardware 142 can include programmable logic such as an FPGA, a programmable logic array (PLA), a programmable array logic (PAL), a generic array logic (GAL), or a complex programmable logic device (CPLD), for example.

The programmable logic service provider 110 can generate configuration data 136 in response to receiving the API request 130. The generated configuration data 136 can be based on the application logic and the host logic. Specifically, the generated configuration data 136 can include information that can be used to program or configure the configurable hardware 142 so that it performs the functions specified by the application logic and the host logic. As one example, the programmable logic service provider can generate the host logic including logic for interfacing between the CPU 144 and the configurable hardware 142. In some examples, the host logic can include logic for masking or shielding the application logic, including any of its included debugging functionality, from communicating directly with the CPU 144 so that all CPU-application logic transactions pass through the host logic. In this manner, the host logic can potentially reduce security and availability risks that could be introduced by the application logic. In other examples, the application logic can communicate directly to the CPU 144 via an interface, such as PCIe, Ethernet, Infiniband, or other suitable interface.

Generating the configuration data 136 can include performing checks and/or tests on the application logic, integrating the application logic into a host logic wrapper, synthesizing the application logic, and/or placing and routing the application logic.

Generating the configuration data 136 can include compiling and/or translating source code of the application logic and the host logic into data that can be used to program or configure the configurable hardware 142. For example, the programmable logic service provider 110 can integrate the application logic into a host logic wrapper. Specifically, the application logic can be instantiated in a system design that includes the application logic and the host logic. The integrated system design can synthesized, using a logic synthesis program, to create a netlist for the system design. The netlist can be placed and routed, using a place and route program, for the instance type specified for the system design. The placed and routed design can be converted to configuration data 136 which can be used to program the configurable hardware 142. For example, the configuration data 136 can be directly output from the place and route program.

As one example, the generated configuration data 136 can include a complete or partial bitstream for configuring all or a portion of the configurable logic of an FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different partitions or regions which can be configured independently of one another. As one example, a full bitstream can be used to configure the configurable logic across all of the regions and a partial bitstream can be used to configure only a portion of the configurable logic regions. For example, individual partial bitstreams for each of a host logic portion, and a number of user portions: a first application logic portion, a second application logic portion, etc., can be generated, downloaded to a configurable hardware platform, and used to independently program different portions of a single FPGA. Because the partial bitstreams can be applied independently, detailed knowledge of other portions of the FPGA need not be made available to others, thereby protecting user privacy. In some examples, some or all of the bitstreams can be further protected using encryption. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The programmable logic service provider 110 can store the generated configuration data 136 in a logic repository database 150 and/or logic configuration storage 155. The logic repository database 150 and the logic configuration storage 155 can include storage implemented with removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the programmable logic service provider 110. In some examples, the configuration data is provided as part of a software application marketplace. Additionally, the programmable logic service provider 110 can provide an interface for using a programmable logic service provider 110 generate and store input files (such as the specifications for the application logic and the host logic) and metadata about the logic designs and/or the users of the programmable logic service provider 110. The generated configuration data 136 can be indexed by one or more properties such as a user identifier, an instance type or types, a marketplace identifier, a machine image identifier, and a configurable hardware identifier, for example. In some examples, the programmable logic service provider 110 is configured to interface with a logic repository service for management of configuration data.

The programmable logic service provider 110 can receive an API request 160 to download configuration data. For example, the request 160 can be generated when a user of the compute resources 120 launches or deploys a new instance (e.g., an "F1.small" instance) within the compute resources 120. As another example, the request 160 can be generated in response to a request from an application executing on an operating instance. The request 160 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 150, and validated configuration data 162 (e.g., a full or partial bitstream) can be downloaded to the requesting instance (e.g., server computer 140). The validated configuration data 162 can be used to configure the configurable logic of the destination instance.

The programmable logic service provider 110 can verify that the validated configuration data 162 can be downloaded to the requesting instance. Validation can occur at multiple different points by the programmable logic service provider 110. For example, validation can include verifying that the application logic is compatible with the host logic. In particular, a regression suite of tests can be executed on a simulator to verify that the host logic performs as expected after the application logic is added to the design. Additionally or alternatively, it can be verified that the application logic is specified to reside only in reconfigurable regions that are separate from reconfigurable regions of the host logic. As another example, validation can include verifying that the validated configuration data 162 is compatible with the instance type to download to. As another example, validation can include verifying that the requestor is authorized to access the validated configuration data 162. If any of the validation checks fail, the programmable logic service provider 110 can deny the request to download the validated configuration data 162. Thus, the programmable logic service provider 110 can potentially safeguard the security and the availability of the computing resources 120 while enabling a user to customize hardware of the computing resources 120.

As stated above, in some examples, operations described above for the programmable logic service provider 110 can be performed using the server computer 140, using other resources within the compute resources 120, or using other resources besides the compute resources 120.

Figure 2:
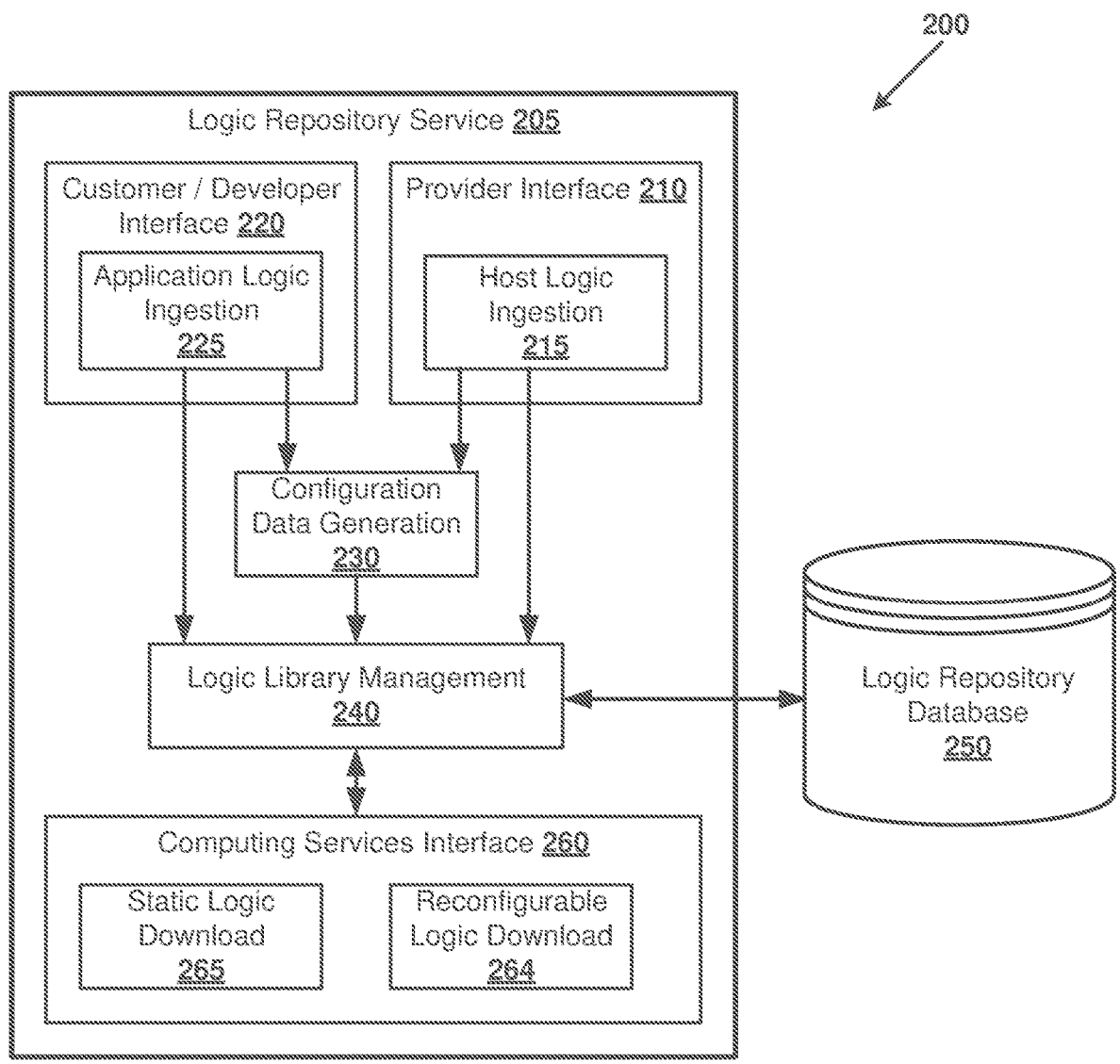
FIG. 2 is a system diagram showing an example architecture of a logic repository service.

FIG. 2 is a system diagram showing an example architecture 200 of a logic repository service 205. The logic repository service 205 can be software executing on a server computer managed by a programmable logic service provider. The logic repository service 205 can be accessed through one or more web APIs. For example, the programmable logic service provider 110 can interact with the logic repository service 205 via an API, including pass-through of certain commands from users to the logic repository service.

The logic repository service 205 can include a provider interface 210 for servicing API requests from the programmable logic service provider 110. The provider interface 210 can be used to authenticate that requests are from agents of the compute service provider, such as by authenticating the identity of the requestor using credentials provided in the request. The provider interface 210 can provide host logic ingestion functionality 215. In particular, the provider interface 210 can receive a request to upload a host logic design to the logic repository service 205 and the request can be processed by the host logic ingestion functionality 215. As described previously, the host logic can include logic for sandboxing the application logic to maintain the security and availability of the computing resources. Additionally, the host logic can be further divided into static logic and reconfigurable logic. The static logic can be configured during an initialization sequence (e.g., at boot time), whereas the reconfigurable logic can be configured at different times during the operation of the configurable logic. As one example, a PCI Express interface can specify that a PCI endpoint be booted and enumerated within about one hundred milliseconds after a reset signal is deasserted. The host logic can be divided into static logic that can be loaded within the allotted time window, and reconfigurable logic that can be loaded after the time window has passed. The static logic can be used as an interface between different reconfigurable regions.

The host logic design can be specified using HDL source code, written in, for example, System Verilog, Verilog, or VHDL. The HDL source code can be encrypted or non-encrypted. In some examples, netlists describing logic components can be provided in addition to, or instead of, HDL source code. The host logic ingestion module 215 can be used to perform checks on the received host logic design, decrypt the host logic design, and/or provide versioning information for the host logic design. Additionally, the request can include information for associating the host logic design with one or more instance types. For example, some host logic designs may work only with one subset of instance types and other host logic designs may work only with a different subset of instance types.

The logic repository service 205 can include a customer-developer interface 220 for servicing API requests from the users of the logic repository service 205. The customer-developer interface 220 can be used to authenticate that requests are from users of the compute service provider, such as by authenticating the identity of the requestor using credentials provided in the request. For example, each of the users can be provided with an account that can be used to identify the user for access management, billing, and usage tracking. The users can be limited to viewing and modifying only the logic designs to which they are authorized to access. For example, the users can be prevented from uploading and/or modifying host logic.

The customer-developer interface 220 can include application logic ingestion functionality 225 for receiving and/or processing an application logic design. The application logic design can be specified using source code (e.g., HDL language code, expressed in SystemVerilog, Verilog, C, SystemC, or other suitable description language), a netlist including a list of configurable logic blocks and the connections between the configurable logic blocks, and/or configuration data. For example, the HDL code may describe instantiations of virtual debug units, which will then be stitched into the configuration data by including proprietary netlists not accessible to the engineer developing the source code. As another example, the configuration data can include a full or partial bitstream which has been pre-compiled for at least certain portions before being uploaded to the logic repository service. The application logic will be combined with host logic (such as by a configuration data generation block 230) to create the logic that can be loaded onto a configurable hardware platform. Processing the application logic design can include translating and/or compiling source code to a lower level format (e.g., compiling OpenCL to generate behavioral or structural Verilog), verifying that required logic and/or signals are present (such as interface signals to the host logic), verifying that known restricted circuits are not present (such as ring oscillators), and other various tasks in preparation for generating configuration data.

The customer-developer interface 220 can accept various types of requests from a user. As one example, a user can request to create a configurable hardware image (CHI). A CHI can provide information for configuring an instance of configurable hardware within a computing environment. For example, a CHI can include one or more compatible instance types, the configuration data for configuring the configurable hardware, access permissions for controlling access to the CHI, and any other information associated with configuring the configurable hardware. The request to create the CHI can include fields for a design description or title, a production status of the design, whether or not the design is encrypted, a reference to source code for the design, a type of source code indicator, an instance type or types that are compatible with the configuration data, and a reference to a location to store reporting information.

The configuration data generation block 230 can be used to create configuration data for programming a reconfigurable logic device. For example, the configuration data can be based on an application logic design and a host logic design. As another example, the configuration data can be based on only an application logic design or only a host logic design. In particular, the configuration data generation block 230 can generate static logic based only on the host logic design. Additionally, the configuration data generation block 230 can generate reconfigurable logic for one or more reconfigurable regions of the configurable logic. For example, the configuration data generation block 230 can be used to generate host reconfigurable logic for a region reserved for host functions. As another example, the configuration data generation block 230 can be used to generate application reconfigurable logic for a region reserved primarily for application functions.

Inputs to the configuration data generation block 230 can be an application logic design (such as from the application logic ingestion 225), a host logic design (such as from the host logic ingestion 215), and/or constraints describing various implementation details (such as clock frequencies, partitioning information, placement information, a target technology, and so forth). The logic designs can include source code described using an HDL, a netlist, and/or configuration data. The configuration data generation block 230 can combine an application and a host design into one design to create the configuration data. As described in more detail with reference to FIG. 3, the configuration data generation block 230 can include a logic synthesis tool and a place and route tool. Using these tools, the configuration data generation block 230 can create configuration data for loading on a configurable hardware platform.

The output from the configuration data generation block 230 can be managed using the logic library management block 240. For example, the logic library management block 240 can associate user information with the configuration data and store the information at the logic repository database 250.

The computing services interface 260 can be used as an interface between the logic repository service 205 and computing resources. For example, when an instance is created on the computing resources, an API request can be sent to the computing services interface 260 and configuration data can be downloaded to the requesting resource. The static logic download component 265 can be used to download static logic to the configurable hardware platform on the requesting instance. Additionally, a request can be for reconfigurable logic, and the reconfigurable logic download component 264 can be used to service the request. Specifically, the reconfigurable logic download can retrieve the configuration data through the logic repository database 250 via the logic library management block 240. The request can be for reconfigurable host logic or for reconfigurable application logic.

Figure 3:
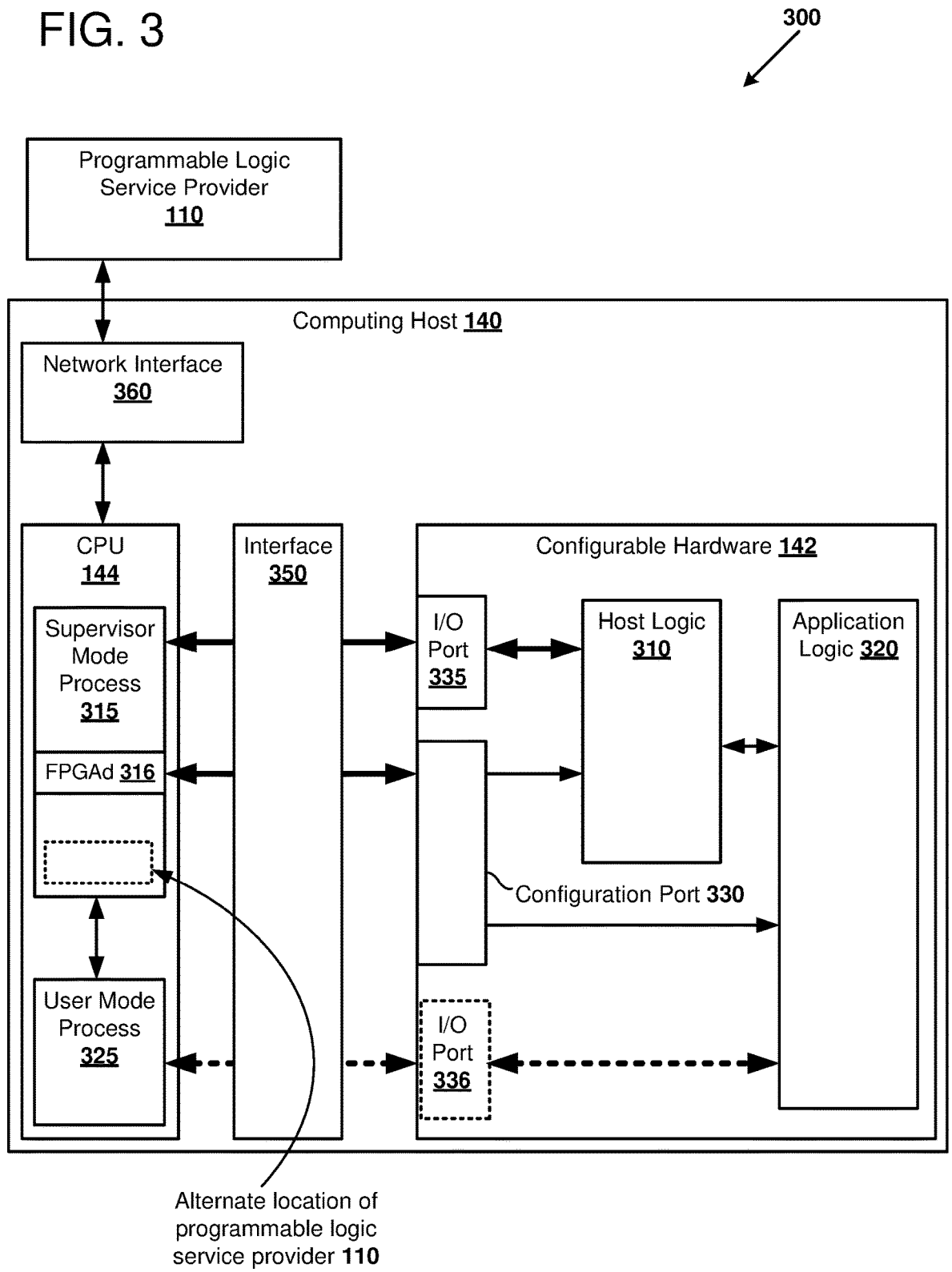
FIG. 3 is a block diagram outlining an example system supporting compute instances launched by a programmable logic service provider, as can be implemented in certain examples of the disclosed technology.

FIG. 3 is a block diagram 300 further detailing an example of the server computer 140, including CPU 144 and configurable hardware 142, as can be used in certain examples of the disclosed technology. As shown, the configurable hardware 142 includes reconfigurable logic devices that have been programmed to implement host logic 310 and application logic 320. The host logic 310 can includes static logic, which is typically reprogrammed infrequently, and dynamic logic, which is typically reprogrammed more frequently. For example, the dynamic logic may be reconfigured each time the application logic 320 is reprogrammed or modified. The application logic 320 can be used to implement function accelerators, which are reconfigurable hardware that has been configured in order to accelerate calculation of functions specified to be performed by the application logic 320. The configurable hardware 142 can include a plurality of application logic portions, for example, that communicate with different users of the system. In some examples, the application logic portions can be reprogrammed independently of the other application logic portions. For example, if two or more application logic portions are included on a single FPGA integrated circuit, any other portions of the FPGA can be partially reconfigured in order to reprogram only one of the application logic portions selected. In some examples, FPGA portions are selected, based in part on programming granularity and features of the targeted FPGAs. For example, FPGA portions may be created by assigning a range of rows or a range of columns of arrayed logic components in an FPGA to different portions.

For the example shown in FIG. 3, the host logic 310 is associated with a supervisor mode process 315 executing on the CPU 144. The supervisor mode process 315 executes at a higher level of privilege than other processes of the CPU. For example, an administrator of the server computer 140 may be the only entity with sufficient permissions to use or control the supervisor mode process 315. The CPU 144 can also host an FPGA service (or daemon), dubbed FPGAd 316. The FPGAd is a lightweight service that controls operation and maintenance functions for the configurable hardware.

The application logic 320 is associated with a corresponding user mode process 325. The user mode processes have a lower permission level than the supervisor mode process 315, and thus other users, in addition to an administrator, can control and use the user mode processes. In some examples, the programmable logic service provider 110 is hosted by the computing host CPU 144. In other examples, the programmable logic service provider 110 is provided by a separate server that accesses the computing host server computer 140 via a network interface 360. For example, Ethernet, 802.11 wireless protocols, virtual private networks, the Internet, and other suitable computer networks can transmit messages to and from the programmable logic service provider 110.

The configurable hardware 142 (e.g., as in an FPGA) can be programmed using a configuration port 330, which can be used to program both the host logic 310 and the application logic. In the example shown, the host logic 310 has a dedicated input/output (I/O) port 335 which can send and receive data from the application logic 320 (as well as data from the host logic itself) to the CPU 144 via an interface 350. In alternative examples, another I/O port 336 can send data between the application logic 320 and the CPU 144 directly, bypassing the host logic 310. The interface 350 can be implemented with any suitable interconnect technology, including, but not limited to: PCIe, Ethernet, and Infiniband. Each of the application logic portions uses a different reserve portion of the interface 350 in order to communicate to its associated user mode process. For example, each of the user mode processes may be allowed access to a different range of memory addresses, and the host logic 310 in turn couples each of the individual application logic portions to only the memory address ranges associated with their corresponding process. Similarly, the supervisor mode process 315 can be coupled to the host logic 310 via another restricted memory range. In other examples, data from the application logic 320 is sent to the CPU 144 via the host logic I/O port 335 not through a separate I/O port.

In some examples, each of the processes coupled to the host logic 310 and/or the application logic portion 320 are associated with a process that is executed in a different virtual machine hosted by the CPU 144. In other examples, two or more of the processes can execute within the same virtual machine.

Figure 4:
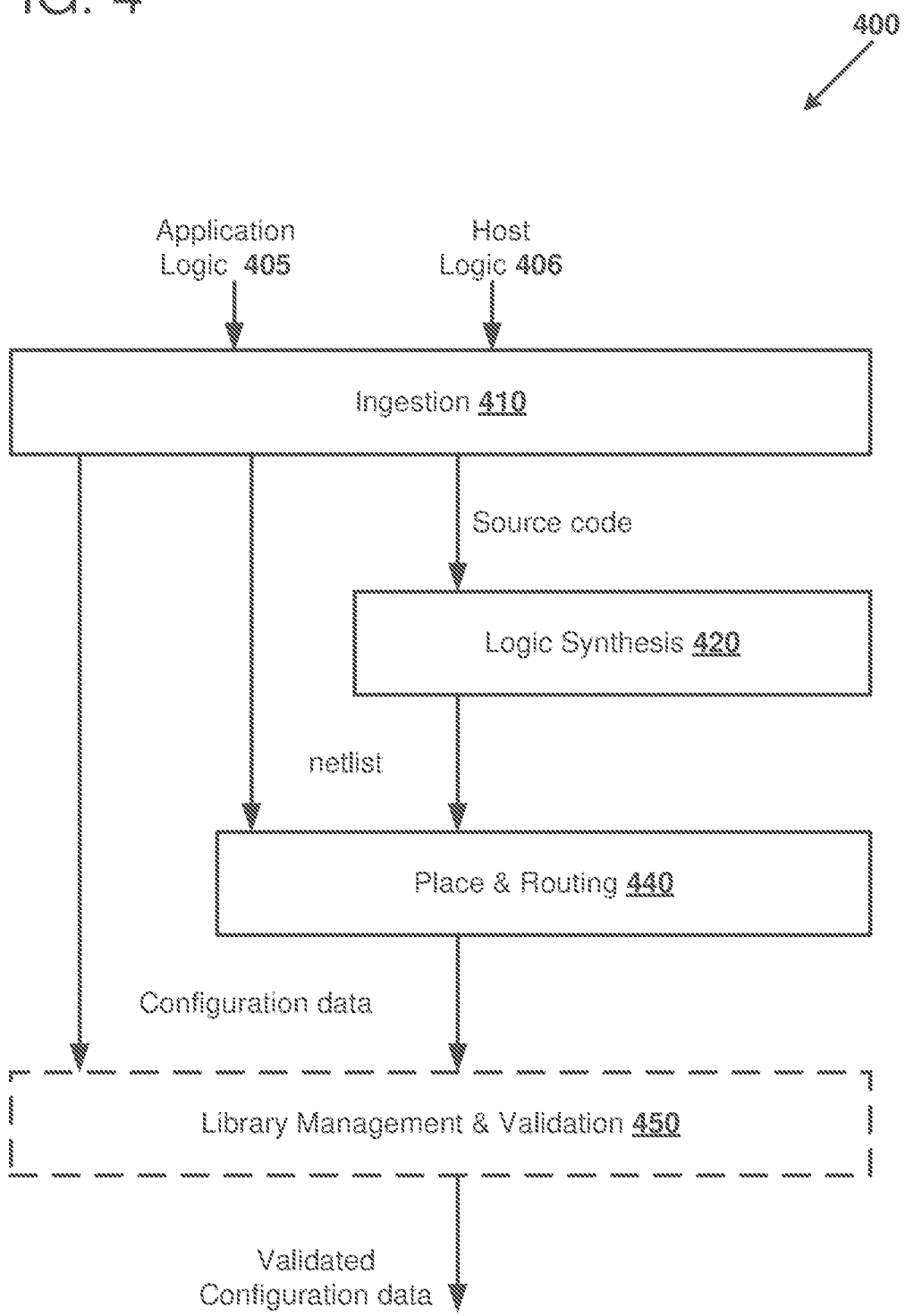
FIG. 4 illustrates an example of ingestion and generation of configuration data, as can be performed via a programmable logic service provider.

FIG. 4 illustrates an example flow 400 of ingesting logic designs and producing configuration data as can be performed by a logic repository service. During ingestion 410, descriptions of application logic 405 and host logic 406 can be received by a programmable logic service provider. The logic design can be encrypted, such as by using the IEEE 1735-2014 encryption standard. The logic design can be decrypted during ingestion 410 or during a later step of the flow 400.

As one example, source code for the application logic 405 can be received during the ingestion 410 and the application logic and the debug unit logic can be combined into a design to produce source code for logic synthesis 420 for programming a first portion of a reconfigurable logic device. Source code for the host logic 406 can be used to produce source code for logic synthesis 420 for programming a second portion of the reconfigurable logic device. The logic synthesis 420 can be used to transform a specification written in behavioral and/or structural RTL into a netlist based on a target technology. For example, the logic synthesis 420 can target different configurable logic technologies, such as FPGAs having different architectures, manufacturing processes, capacities, and/or manufacturers. The netlist can include a number of configurable logic blocks, non-configurable blocks (e.g., hard or soft macros), and the connections between the different blocks. The netlist can be a logical netlist where blocks of the netlist are enumerated but unplaced within the target technology. The netlist can be used as input to place and route 440. The place and route 440 can take the instances of the configurable blocks from the netlist and the routing information, and map the blocks to a physical, reconfigurable logic device. The place-and-routed design can include a physical mapping for each of the logical components of the netlist. Additionally or alternatively, the place and route 440 can be timing driven so that the netlist is modified based on timing constraints of the design and the physical constraints of the physical device. The output of the place and route 440 can be configuration data, such as a bitstream image. The configuration data can be partitioned or divided into different components. For example, the configuration data can include data associated with static host logic (e.g., static logic), reconfigurable host logic (e.g., dynamically reconfigurable logic), and/or reconfigurable application logic (e.g., application logic 320). The different components can be overlapping or non-overlapping. For example, the static host logic can be routed through regions that are used by the reconfigurable application logic. Thus, a partial bitstream for the reconfigurable application logic can also include portions of the static host logic.

As another example, a netlist for the application logic and/or the host logic can be received during the ingestion 410. As a specific example, a netlist can be received for the application logic and source code can be received for the host logic. In this case, the host logic can be synthesized with the logic synthesis 420 to generate a netlist for the host logic, and the netlists for the host and application logic can be combined into a single design to produce a netlist for the place and route 440. As another example, configuration data for the application logic and/or the host logic can be received during the ingestion 410. For example, a partial bitstream for the application logic design can be received, or a full bitstream for the host and application logic design can be received.

As another example, a timing report can provide a static timing analysis showing whether the design meets timing specifications of the configurable hardware. The logic synthesis 420 and the place and route 440 can involve random, non-deterministic steps that vary with each run of the tools so that each run of the logic synthesis 420 and the place and route 440 may provide different results. Thus, if a developer has a design that does not meet timing (as indicated by the timing report), the developer may desire to rerun the logic synthesis 420 and/or the place and route 440. In this manner, the developer can iterate on their design by executing multiple synthesis and routing runs for the same design.

The library management and validation 450 functionality can be used to validate the user designs for the configurable logic at various points during the development and deployment steps. As one example, the validation 450 can include performing simulations to verify whether the application logic is compatible with the host logic so that the host logic can constrain the functionality of the application logic. The validation 450 can include comparing a netlist of the application logic and confirming that the application logic meets capacity and area restraints of the configurable hardware platform. For example, the application logic can be restricted to use only logic within one or more reconfigurable regions. If the application logic is outside of those regions, then the application logic can be rejected. Additionally, the application logic can be ingested as a bitstream, and the bitstream can be validated by the validation 450. The validation of a bitstream can include comparing a portion of the ingested bitstream data corresponding to the host logic to a baseline version of the host logic to confirm that the host logic is not corrupted. The output from the validation 450 can be validated configuration data.

Figure 5:
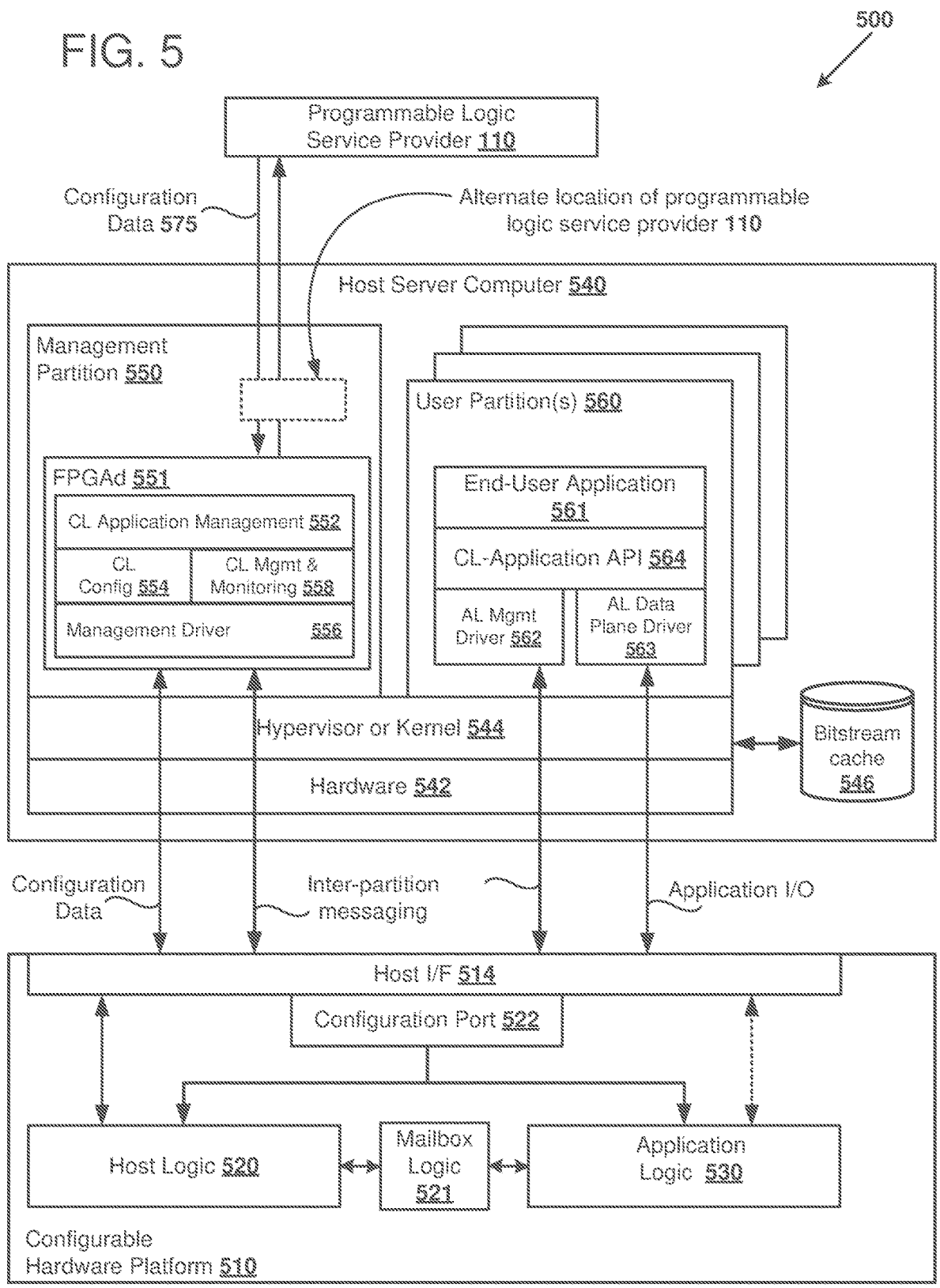
FIG. 5 shows further details of the example system of FIG. 3, including components of a control plane and a data plane for configuring and interfacing to a configurable hardware platform.

FIG. 5 shows further detail of an example system 500 including components of a control plane and a data plane for configuring and interfacing to a configurable hardware platform 510. The control plane includes functions for initializing, monitoring, reconfiguring, and tearing down the configurable hardware platform 510. The data plane includes functions for communicating between a user's application and the configurable hardware platform 510. The control plane can be accessible by users or services having a higher privilege level and the data plane can be accessible by users or services having a lower privilege level. In one example, the configurable hardware platform 510 is connected to a server computer 540 using a local interconnect, such as PCIe. In some examples, a different interconnect, such as Ethernet or Infiniband are used. In an alternative example, the configurable hardware platform 510 can be integrated within the hardware of the server computer 540. As one example, the server computer 540 can be one of the plurality of server computers 1102A-1102C of the compute service provider 1100 of FIG. 11.

The host server computer 540 has underlying hardware 542 including one or more CPUs, memory, storage devices, interconnection hardware, etc. Running a layer above the hardware 542 is a hypervisor or kernel layer 544. The hypervisor or kernel layer can be classified as a type 1 or type 2 hypervisor. A type 1 hypervisor runs directly on the host hardware 542 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management partition 550 (such as Domain 0 of the Xen hypervisor) can be part of the hypervisor or separated therefrom and generally includes device drivers needed for accessing the hardware 542. The management partition 550 can host supervisor privilege level processes that can access privileged portions of the host logic 520, and depending on a particular configuration, may also access one or more portions of the application logic 530.

Configuration data, such as bitstreams used to configure FPGAs on the configurable hardware platform 510 can be cached in a bitstream cache 546, which may be implemented using, for example, memory or storage devices coupled to the host server computer. After storing a bitstream in the bitstream cache 546 a first time, the configurable hardware platform can be re-programmed using the cached bitstreams multiple times, thereby avoiding the overhead of transferring configuration data via network storage.

User host partitions 560 are logical units of isolation within the hypervisor. Each user partition 560 can be allocated its own portion of the hardware layer's memory, CPU allocation, storage, interconnect bandwidth, etc. Additionally, each user partition 560 can include a virtual machine and its own guest operating system. As such, each user partition 560 is an abstract portion of capacity designed to support its own virtual machine independent of the other partitions. The user host partitions 560 execute at a lower level of privilege than the management partition 550 (such as Domain U of the Xen hypervisor). Each of the user host partitions 560 can include a user privilege level process that can access an associated portion of the application logic 530.

The management partition 550 can be used to perform management services for the user host partitions 560 and the configurable hardware platform 510. The management partition 550 can communicate with web services (such as a deployment service, a logic repository service, and a health monitoring service) of the compute service provider, the user host partitions 560, and the configurable hardware platform 510. The management services can include services for launching and terminating user host partitions 560, and configuring, reconfiguring, and tearing down the configurable logic of the configurable hardware platform 510. As a specific example, the management partition 550 can launch a new user partition 560 in response to a request from a deployment service (such as the deployment component 1126 of FIG. 11). The request can include a reference to a machine image (MI) and/or a configurable hardware image (CHI). The MI can specify programs and drivers to load on the user partition 560 and the CHI can specify configuration data to load on the configurable hardware platform 510. The management partition 550 can initialize the user partition 560 based on the information associated with the MI and can cause the configuration data associated with the CHI to be loaded onto the configurable hardware platform 510. The initialization of the user partition 560 and the configurable hardware platform 510 can occur concurrently so that the time to make the instance operational can be reduced.

The management partition 550 can be used to manage programming and monitoring of the configurable hardware platform 510. The management partition 550 can also be used to send and receive debug data to and from the configurable hardware platform 510. By using the management partition 550 for these purposes, access to the configuration data and the configuration ports of the configurable hardware platform 510 can be restricted. Specifically, users with lower privilege levels can be restricted from directly accessing the management partition 550. Further, users with lower privilege levels can be restricted from accessing other user host partitions. Thus, the configurable logic cannot be modified without using the infrastructure of the programmable logic service provider and any third party IP used to program the configurable logic can be protected from viewing by unauthorized users. Further, unauthorized users are also prevented from sending debug data to, or receiving any debug data from, unauthorized partitions on the configurable hardware platform 510.

The management partition 550 can include a software stack for the control plane to configure and interface to a configurable hardware platform 510. The control plane software stack can include a service process 551 (e.g., a Unix daemon or a Windows service) dubbed "FPGAd." The FPGAd service process 551 provides a command interface that can be accessed using simple C language functions and structures, and thus uses minimal message parsing. In other examples, the FPGAd service process can include other more sophisticated interfaces. The FPGAd service process can forward requests for operations to be performed with a configuration logic received from a programmable logic service provider, and return responses generated by performing these operations. For example, the service process can use a privileged domain mailbox request/response communication channel, one for each FPGA integrated circuit, in order to transmit requests and responses. In some examples, the FPGAd service process is stateless with regards to servicing requests and responses. In some examples, the FPGAd service process can supervise the downloading and management of FPGA bitstreams in parallel and provide secure and isolated environment for multi-tenant environments, where more than one different user are sharing reconfigurable resources on the computing instance. In some examples, the service process uses PCIe memory mapped I/O to write bitstreams for programming the FPGAs. The FPGAd service process can update any of the configurable logic of a reconfigurable logic device, including static logic, reconfigurable logic, and other logic resources. The FPGAd service process can be implemented as a Unix daemon or a Windows service, for example.

The control plane software stack can also include a configurable logic (CL) application management layer 552 for communicating with web services (such as the programmable logic service provider 110, a logic repository service, or a health monitoring service), the configurable hardware platform 510, and the user host partitions 560. For example, the FPGAd service process 551 can issue a request to the programmable logic service provider 110 to fetch configuration data in response to a user partition 560 being launched. The FPGAd service process 551 can communicate with the user partition 560 using shared memory of the hardware 542 or by sending and receiving inter-partition messages over the interconnect connecting the server computer 540 to the configurable hardware platform 510. Specifically, the FPGAd service process 551 can read and write messages to mailbox logic 521 of the configurable hardware platform 510. The messages can include requests by an end-user application 561 to reconfigure or tear-down the configurable hardware platform 510. The FPGAd service process 551 can issue a request to the programmable logic service provider 110 to fetch configuration data in response to a request to reconfigure the configurable hardware platform 510. The FPGAd service process 551 can initiate a tear-down sequence in response to a request to tear down the configurable hardware platform 510. The FPGAd service process 551 can perform watchdog related activities to determine whether the communication path to the user partition 560 is functional.

The control plane software stack can include a CL configuration layer 554 for accessing the configuration port 522 (e.g., a configuration access port) of the configurable hardware platform 510 so that configuration data can be loaded onto the configurable hardware platform 510. For example, the FPGAd service process 551 can send messages or commands to the CL configuration layer 554, which in turns sends a command or commands to the configuration port 522 to perform a full or partial configuration of the configurable hardware platform 510. The CL configuration layer 554 can send the configuration data (e.g., a bitstream) to the configuration port 522 so that the configurable logic can be programmed according to the configuration data. The configuration data can specify host logic and/or application logic.

The control plane software stack can include a management driver 556 for communicating over the physical interconnect connecting the server computer 540 to the configurable hardware platform 510. The management driver 556 can encapsulate commands, requests, responses, messages, and data originating from the management partition 550 for transmission over the physical interconnect. Additionally, the management driver 556 can de-encapsulate commands, requests, responses, messages, and data sent to the management partition 550 over the physical interconnect. Specifically, the management driver 556 can communicate with the host logic 520 of the configurable hardware platform 510 via the host interface 514. For example, the management driver 556 can access a physical or virtual function mapped to an address range during an enumeration of devices connected to the physical interconnect. For example, in PCIe implementations, the management driver 556 can communicate with the host logic 520 by addressing transactions to and assigned address range.

The control plane software stack can include a CL management and monitoring layer 558. The CL management and monitoring layer 558 can monitor and analyze transactions occurring on the physical interconnect to determine a health of the configurable hardware platform 510 and/or to determine usage characteristics of the configurable hardware platform 510. For example, the CL management and monitoring layer 558 can monitor whether configuration data is successfully deployed on the configurable hardware platform 510 and can cause a report to be transmitted to the logic repository service indicating the status of the deployment.

The programmable logic service provider 110 can be used to send configuration data 575 to the management partition 550. The configuration data 575 can be validated and then used to program a portion (e.g., one or more configurable logic partitions) of the application logic 530. The programmable logic service provider 110 can also send commands to the management partition to initiate operation of the programmed partitions. The configurable hardware platform 510 can include non-configurable hard macros and configurable logic. The hard macros can perform specific functions within the configurable hardware platform 510, such as input/output blocks (e.g., serializer and deserializer (SERDES) blocks and gigabit transceivers), analog-to-digital converters, memory control blocks, test access ports, and a configuration port 522. The configurable logic can be programmed or configured by loading configuration data onto the configurable hardware platform 510. For example, the configuration port 522 can be used for loading the configuration data. As one example, configuration data can be stored in a memory (such as a Flash or EEPROM memory) accessible by the configuration port 522 and the configuration data can be automatically loaded during an initialization sequence (such as during a power-on sequence) of the configurable hardware platform 510. Additionally, the configuration port 522 can be accessed using an off-chip processor or an interface within the configurable hardware platform 510.

The configurable logic can be programmed to include host logic 520 and application logic 530. In multi-tenant implementations, the host logic 520 can shield the interfaces of at least some of the hard macros from the end-users so that the end-users have limited access to the hard macros and to the physical interconnect. For example, the host logic can restrict access of the user host partitions 560 to only access their associated configurable logic partition(s) within the application logic 530. In a PCIe context, this can be implemented by assigning different user host partitions to different memory address ranges by configuring the base address registers (BARs) to reserve certain memory address ranges for certain combinations of host partitions and configurable logic partitions.

The application logic 530 can include both hard macros and configurable logic. The application logic 530 can be partitioned into two or more portions, and each of the portions can be assigned to one or more of the user host partitions. Each of the configurable logic partitions are excluded from accessing other partitions of the configurable hardware platform by the host logic 520. The host logic 520 can further be coupled to the mailbox logic 521, the configuration port 522, the host interface 514, and the application logic 530. The host interface logic 514 can include circuitry (e.g., hard macros and/or configurable logic) for signaling on the physical interconnect and implementing a communications protocol. The communications protocol specifies the rules and message formats for communicating over the interconnect.

In alternative examples, the application logic 530 is configured to communicate to their respective associated user host partitions 560 without communicating through the host logic 520.

The mailbox logic 521 can include one or more buffers and one or more control registers. For example, a given control register can be associated with a particular buffer and the register can be used as a semaphore to synchronize between the management partition 550 and the user partition 560. As a specific example, if a partition can modify a value of the control register, the partition can write to the buffer. The buffer and the control register are accessible from the host logic 520. In alternative examples, buffer and the control register are accessible from both the host logic 520 and the application logic 530. When the message is written to the buffer, another control register (e.g., the message ready register) can be written to indicate the message is complete. The message ready register can polled by the partitions to determine if a message is present, or an interrupt can be generated and transmitted to the partitions in response to the message ready register being written.

In other examples, the mailbox logic 521 is replaced or augmented by messages transmitted between the application logic 530 and the host logic 520 via the programmable logic service provider 110, the FPGAd service process 551, or both the service provider and the service process. By requiring messages to be sent via the programmable logic service provider 110, additional security features (e.g., message authentication, authorization, or other security features) can be applied by a service executing separately from the configurable hardware platform 510 (and in certain cases, the host server computer 540).

The user partition 560 can include a software stack for interfacing an end-user application executing within the user partition to the configurable hardware platform 510. The application software stack can include functions for communicating with the control plane and the data plane. However, the user partitions 560 may be restricted from accessing the configuration port 522. For example, the user partitions may be restricted from accessing read or write data from the configuration port. In some examples, the user partitions 560 may be granted limited read access to the configuration port.

The application software stack can include a CL-Application API 564 for providing the end-user application executing within the user partition 560 with access to the configurable hardware platform 510. The CL-Application API 564 can include a library of methods or functions for communicating with the configurable hardware platform 510 and the management partition 550. For example, the end-user application 561 can send a command or data to the configurable application logic 530 by using an API of the CL-Application API 564. In particular, the API of the CL-Application API 564 can interface with the application logic (AL) data plane driver 563 which can generate a transaction targeted to the application logic 530 which can communicate with the targeted partition. In this manner, the end-user application 561 can cause the configurable application logic 530 to receive, process, and/or respond with data to potentially accelerate tasks of the end-user application 561. As another example, the end-user application 561 can send a command or data to the management partition 550 by using an API of the CL-Application API 564. In particular, the API of the CL-Application API 564 can interface with the AL management driver 562 which can generate a transaction targeted to the application logic 530 which can communicate with the mailbox logic 521. In this manner, the end-user application 561 can cause the management partition 550 to provide operational or metadata about the configurable hardware platform 510.

Figure 6:
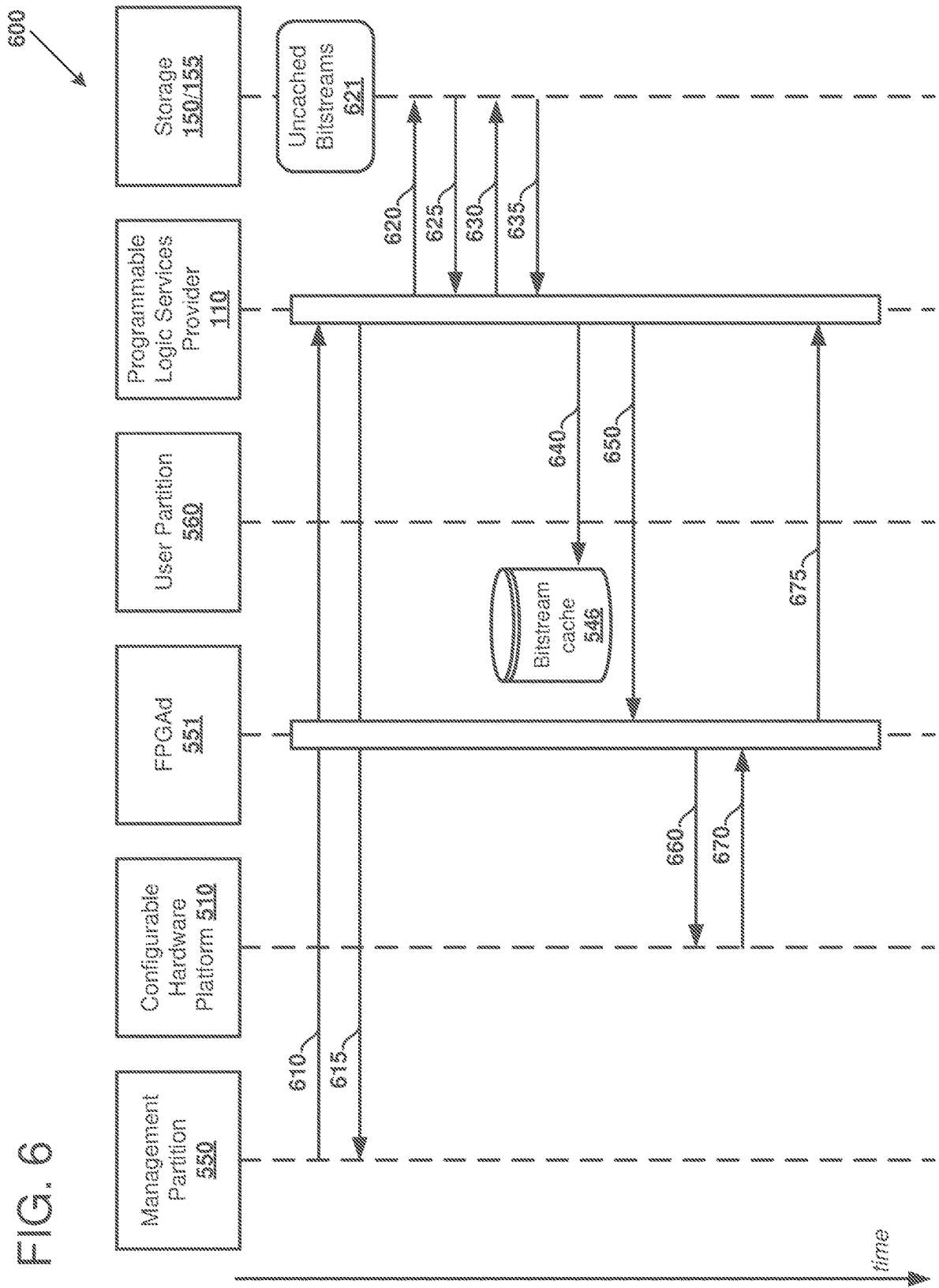
FIG. 6 is a sequence diagram outlining an example of system initialization, as can be performed in certain examples of the disclosed technology.

FIG. 6 is a sequence diagram 600 illustrating an example of messages passed between system components during system initialization, as can be performed in certain examples of the disclosed technology. For example, the system 500 discussed above regarding FIG. 5 can be used to implement the disclosed operations.

At message 610, a supervisor level process executing within the management partition 550 submits a request to create a compute instance. This request can include, for example, an instance ID and slot number. The programmable logic service provider 110 can provide a mapping to a particular compute instance metadata identifier, which identifies an image to load on the compute instance. The message 610 is sent to the programmable logic services provider 110, which create the instance and returns a status message 615 indicating whether the operation was completed successfully.

The programmable logic services provider 110 in turn sends a request 620 with an encoded identifier (e.g., a machine image identifier, a product code, or an identifier of a physical or virtual compute instance) to the storage resources 150, 155 in order to retrieve uncached bitstreams 621 identified using the identifier. In some examples, a compute instance identifier can be mapped to a reconfigurable resource identifier, which identifies configuration data that can be used to program the reconfigurable resources. In some cases, the compute instance identifier may be matched to multiple different reconfigurable device identifiers, depending on available reconfigurable hardware resources, which can vary based on the reconfigurable logic device: type, manufacturer, size, capability, or other suitable parameters of the device. Responsive to sending the request with the compute instance identifier, the storage 155, 150 returns 625 a metadata file including a bitstream identifier, a bitstream uniform resource identifier (URI), the state of the request, and a timestamp. The programmable logic services provider 110 analyzes the response and if the identified configuration data is acceptable, sends a request message 630 to the storage 150, 155 containing the bitstream URI.

Responsive to receiving this request, the storage returns 635 configuration data, for example the identified bitstream.

As the bitstream is received by the programmable logic services provider 110, a file system write message 640 is sent to the bitstream cache 546. There, configuration data including FPGA bitstreams can be temporarily stored in local storage at the computing instance on which the reconfigurable hardware will be programmed and executed. The programmable logic services provider 110 then sends a load bitstream request message 650 to the FPGAd service process. Responsive to receiving the request, the service process sends a request to one or more reconfigurable logic devices of the computer instance to load the bitstream 660, and receives a status response 670 from the reconfigurable logic devices indicating whether bitstream loading was successful. If programming the reconfigurable logic devices is successful, the FPGAd service process sends a status message 675 to the programmable logic service provider indicating whether loading the bitstream was successful.

Figure 7:
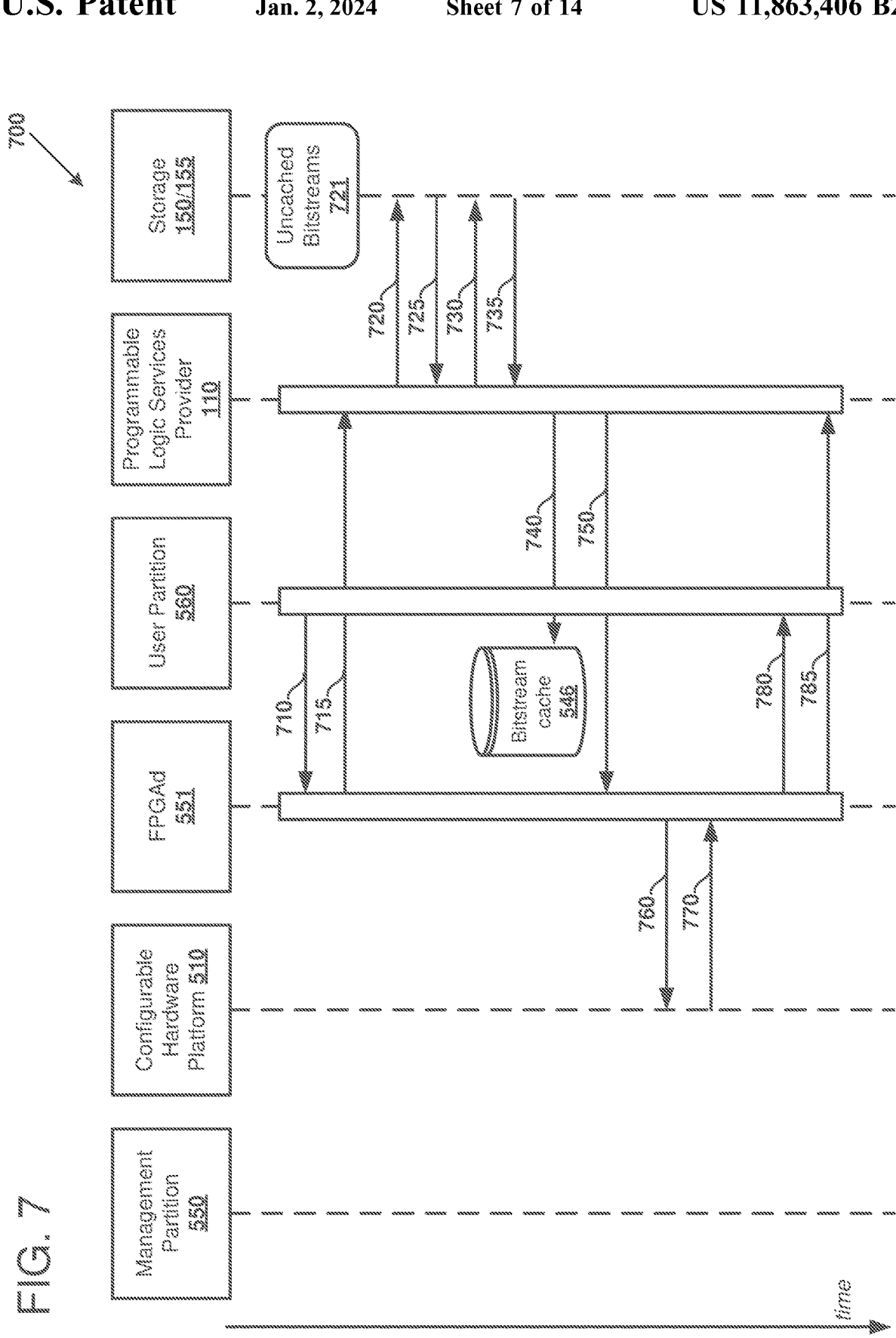
FIG. 7 is a sequence diagram outlining an example method of loading a bitstream with a programmable logic services provider, as can be performed in certain examples of the disclosed technology.

FIG. 7 is a sequence diagram 700 outlining a series of actions and message performed when loading and programming a bitstream for one or more reconfigurable logic devices, as can be performed in certain examples of the disclosed technology.

The user partition 560 initiates loading of the bitstream by sending a load request 710 to the FPGAd service process 551. Responsive to receiving the request, the service process sends a get bitstream message 715, including an indication of the bitstream type, a compute instance identifier, a bitstream identifier, and an FPGA slot identifier to the programmable logic services provider 110. For example, the user operating the previously allocated compute instance can decide to load a bitstream on their local computing hardware, and send a request over a computer network to a programmable logic service provider located at another server, including servers hosted in a computing cloud.

The programmable logic services provider 110 in turn submits a request 720 to database and/or networked storage 150, 155 and receives a response message 725 indicating the bitstream identifier, a bitstream URI, the status of the request, and a time stamp. The programmable logic services provider 110 authenticates this response and if the bitstream is authorized for use by the requesting compute instance user, submits a request 730 to the storage 150, 155 containing the bitstream URI. Responsive to receiving the request message 730, the storage sends response message 735 including the requested configuration data 721, such as FPGA bitstreams.

After transmission of the configuration data begins, the programmable logic services provider 110 sends a write message 740 to the bitstream cache 546. As, or after, the bitstream is cached, the services provider sends a load bitstream request message 750 to the FPGAd service process 750. Responsive to receiving the load bitstream request, the service process 551 sends a load bitstream command 760 including the bitstream data to one or more of the configurable logic devices and receives a status message 770 once loading the bitstreams and programming the reconfigurable logic devices has completed. The service process 551 then sends a message 780 to the user partition 560 indicating whether the bitstream was successfully loaded, and then sends another message 785 to the programmable logic service provider 110 indicating whether programming of FPGAs with the indicated bitstreams has completed.

Figure 8:
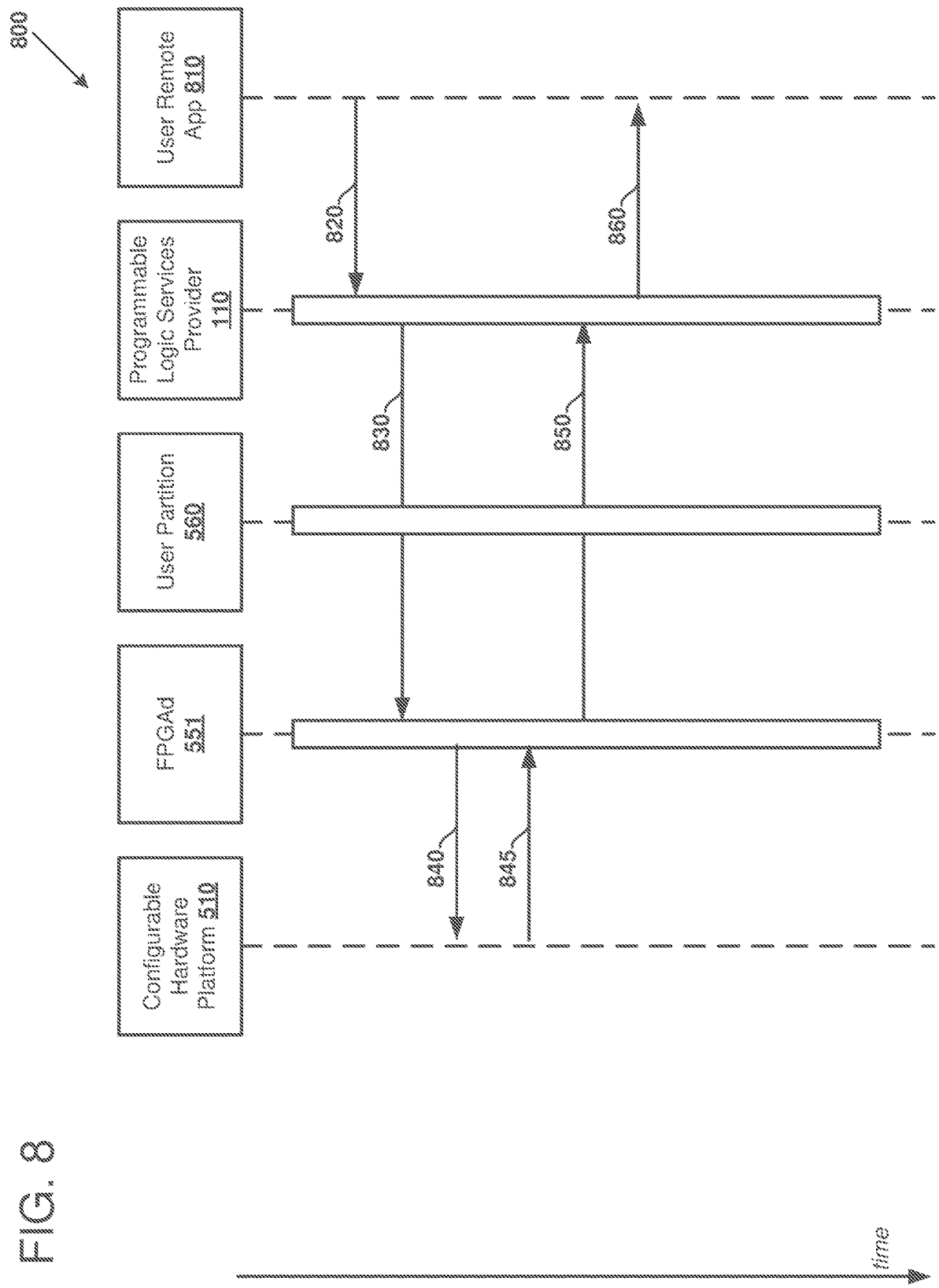
FIG. 8 is a sequence diagram illustrating an example of accessing FPGA registers, as can be performed in certain examples of the disclosed technology.

FIG. 8 is a sequence diagram 800 outlining messages that can be sent as part of a register access operation, according to certain examples of the disclosed technology.

As shown, a remote user application 810 can initiate the registered access transaction. For example, a remote user can initiate a request to access one or more registers of the FPGA using an application transport layer (e.g., using http requests). This message 820 is transmitted via a computer network to a programmable logic services provider 110. The programmable logic services provider 110 maps the request 830 to the associated compute instance and transmits the request to the FPGAd service process 551.

The service process 551 sends a request 840 to read the requested registers to one or more of the reconfigurable logic devices and receives response message 845, indicating whether the register read requests were successful and, if the request was successful, one or more values produced as a result of the read operation.

The FPGAd service process 551 sends a response message 850 indicating the status and any read register values to the programmable logic services provider 110, which in turn sends a message 860 to the user remote app 810. Thus, users located at arbitrary locations within a computing network, including over the Internet or other suitable computing networks, can access FPGA data such as register values. The illustrated sequence diagram 800 can similarly be adapted in order to write data to the FPGA registers, using different message commands and FPGA commands.

Figure 9:
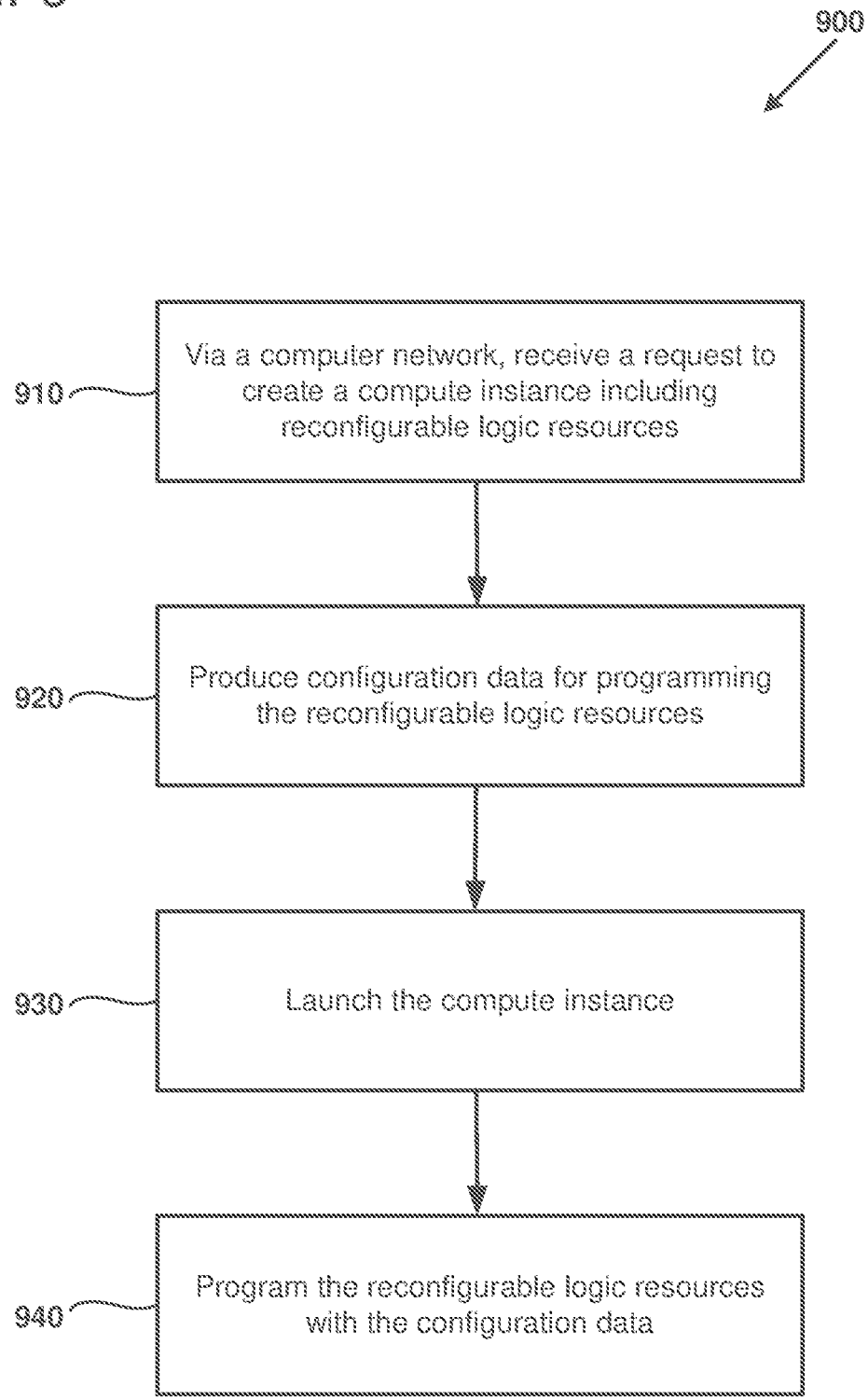
FIG. 9 is a flowchart outlining a method of programming reconfigurable logic resources responsive to receiving a request on a computer network, as can be performed in certain examples of the disclosed technology.

FIG. 9 is a flowchart 900 outlining an example method of programming reconfigurable logic resources using a networked programmable logic service provider, as can be performed in certain examples of the disclosed technology. For example, systems such as those described above regarding FIGS. 1, 3, and 5 can be used to implement the illustrated method.

At process block 910, a request is received via computer network to create a computing instance that includes reconfigurable logic resources. For example, a user can send a request to a programmable logic service provider hosted on a network server provided by a computing cloud. The programmable logic service provider can implement domain logic for authenticating and controlling access to configuration data and compute hardware containing reconfigurable logic devices.

At process block 920, configuration data is produced for programming the reconfigurable logic resources. In some examples, the producing configuration data occurs prior to launching the request to compute instance. In some examples, the producing includes authenticating the request to determine whether the request authorizes an associated user to access the requested configuration data. In some examples, the request is received from a first party user and the configuration data is received from a third party user different than the first party user. In some examples, a financial transaction is processed associated with the request prior to providing the configuration data. The configuration data is provided if, and only if, the financial transaction is successfully processed. In other examples, usage of compute resources (e.g., including usage of reconfigurable logic resources) is metered and a financial transaction is processed at a later point in time based on the metered usage. In some examples, the configuration data is provided without an additional fee. Thus, configuration data including bitstreams can be sold or leased to other users from third party providers.

In some examples, producing the configuration data further includes having a machine image indicator to set a configuration data and selecting configuration data to produce based on the mapping. For example, a machine image indicator for a particular type or class of computing instance may be matched to one, or more than one, configuration data indicators, and a selected one of a plurality of configuration data can be selected based on the target computing host. For example, computing instances in the environment may have access to different types, manufacturers, or size of reconfigurable logic devices. In some examples, producing configuration data includes retrieving a bitstream URI from storage that is sent to the programmable logic service provider, and the provider in turn selects one of the indicated bitstreams to request and then sent the computing instance.

In some examples, producing the configuration data is performed by compiling source code indicated by the request to create a programming file for at least a portion of the configuration data. For example, source code expressed in a hardware description language such as SystemVerilog, SystemC, C, or other suitable source code can be provided by the requesting user and compiled using the programmable logic service provider. In some examples, a library or API is provided that maps function calls to accelerator functions implemented using configurable hardware resources. Thus, the programmable logic service provider provides an encapsulated tool chain for converting the source code into bitstreams that can be loaded onto reconfigurable logic devices of the computing instance. The requesting user thus need not have access to low level implementation details such as netlists, FPGA place and route data, or other such data. Further, access to the FPGA can be provided as a web service instead of requiring the use of a command line interface to run a series of tools in sequence. Thus, a web service can provide a robust interface that hides complexity from the user, thereby providing a user-friendly environment for implementing tasks such as function accelerators using reconfigurable logic devices.

In some examples, the programmable logic service provider further performs operations associated with purchasing and/or licensing machine instance identifiers and their associated reconfigurable logic identifiers. In some examples, configuration data can be produced from a bitstream cache local to the computing instance, for example such as when reinitializing the compute instance with a previously used set of configuration data that is obtained from network storage. In some examples, the configuration data is a predefined set of configuration data that can then have a portion of the data reprogrammed for a particular user. In such examples, a generic configuration image can be cached at a compute instance, and customized in a shorter period of time than required to produce and load a complete set of bitstreams. In some examples, reprogramming of the FPGA can be implemented multiple times per compute instance session. This can be particularly useful in cases where a user of the compute instance is performing debugging operations of an accelerator function implemented using a reconfigurable logic device.

At process block 930, a compute instance is launched. Launching the instance includes executing a supervisor privilege level process and at least one user process using a general-purpose processor on the compute instance host. For example, a service process such as an FPGAd service process can be used to control management and configuration of the reconfigurable logic resources. The user processes can interact with the FPGAd service process and/or the programmable logic service provider to receive of configuration data and provide requests to the service process. In some examples, the compute instance is completely cleared before indicating a new compute instance. In other examples, some of the compute instance state is preserved and the compute instance is partially reset. For example, the existing service process and/or user processes can maintain their state while the reconfigurable logic devices are reset and reprogrammed. In some examples, only a portion of the reconfigurable logic devices such as static logic, reconfigurable logic, host logic, and/or customer logic are reprogrammed and/or reinitialized.

In some examples, the configuration data is produced prior to launching the compute instance and the launching includes programming the reconfigurable logic resources with the produced configuration data prior to providing the compute instance to the requester, such as a requesting user.

At process block 940, the reconfigurable logic resources are programmed with the configuration data. For example, an FPGAd service process can manage application and configuration data to one or more FPGAd processes of the computing instance and return status messages indicating success or failure of the reprogramming operation.

Figure 10:
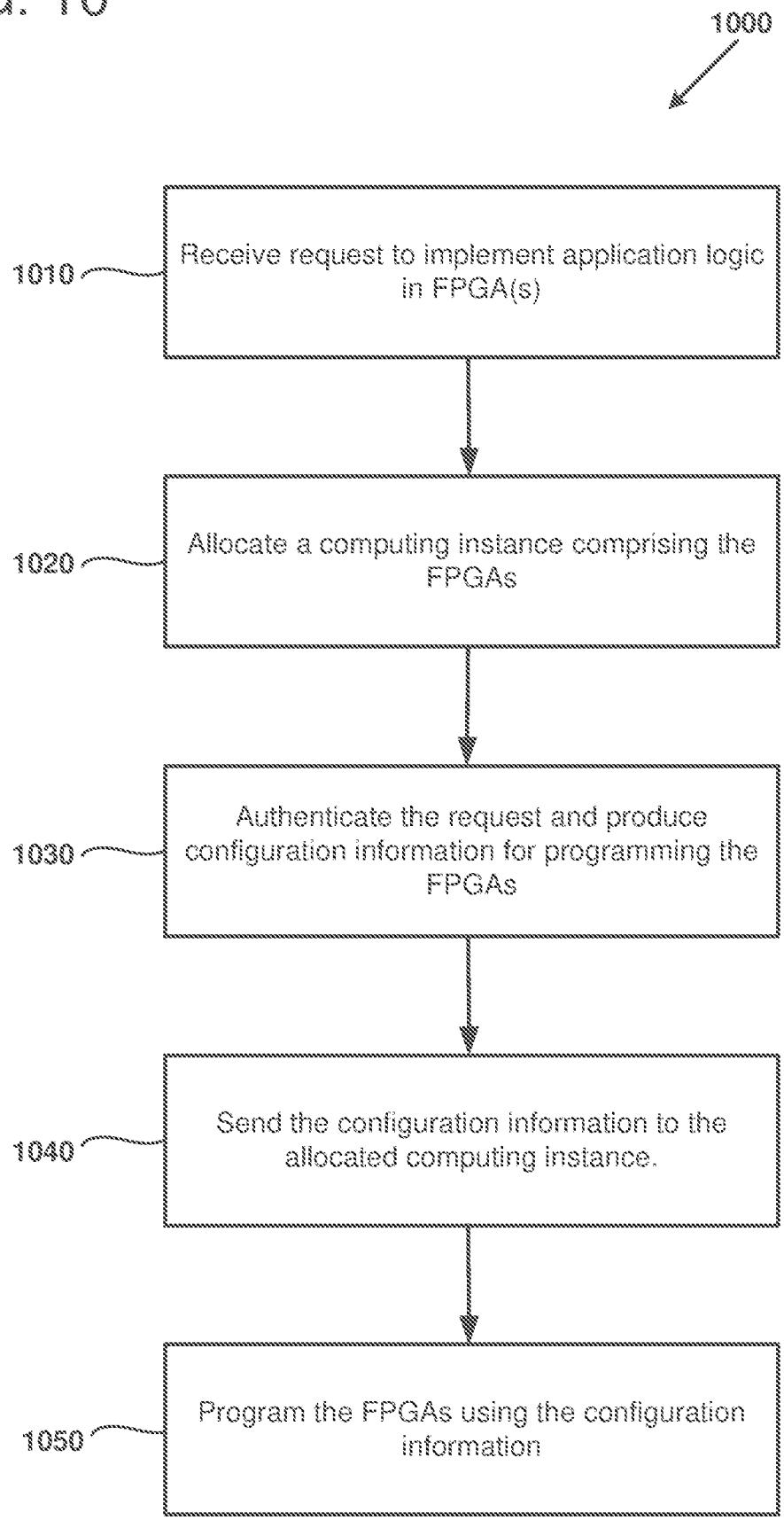
FIG. 10 is a flowchart outlining an example method of programming FPGAs in a network environment, as can be performed in certain examples of the disclosed technology.

FIG. 10 outlines an example method 1000 of programming FPGAs in a web-based service environment as can be performed in certain examples of the disclosed technology. For example, the systems discussed above regarding FIGS. 1-5 can be used to implement the outlined method.

At process block 1010, a request is received to implement application logic at one or more FPGAs. For example, the user can submit a request using an API via the internet to a computing cloud. In some examples, the request is received from a first party that is different from the third party that will provide the configuration data for performing the outlined method. In some examples, the request includes an indicator of a machine image to be used for launching a request to compute instance. The machine image indicator can be mapped to a set of one or more sets of configuration data and one of the sets of the configuration data can be selected for programming the computing instance.

At process block 1020, a computing instance can be allocated comprising the requested FPGAs. For example, a programmable logic services provider can identify available compute resources and allocate one or more computing hosts as a computing instance for implementing the requested application logic.

At process block 1030, the request is authenticated and configuration information is produced for programming the FPGAs. In some examples, this includes executing domain logic to authenticate and process financial transactions for buying, leasing, or licensing configuration data images.

At process block 1040, the configuration information that was authenticated and produced at process block 1030 is sent to the computing instance that is allocated at process block 1020. In some examples, at least a portion of the configuration information can be received from a bitstream cache. For example, previously used, or default configuration data associated with the computing instance image can be stored in a local bitstream cache, thereby avoiding transferring bitstreams of a computing instance and thus improving network bandwidth usage and response time.

At process block 1050, the requested FPGAs are programmed using the configuration information. For example, a service process executed on the computing host can apply the configuration data to one or more configuration ports of the FPGA in order to program the associated FPGAs.

Figure 11:
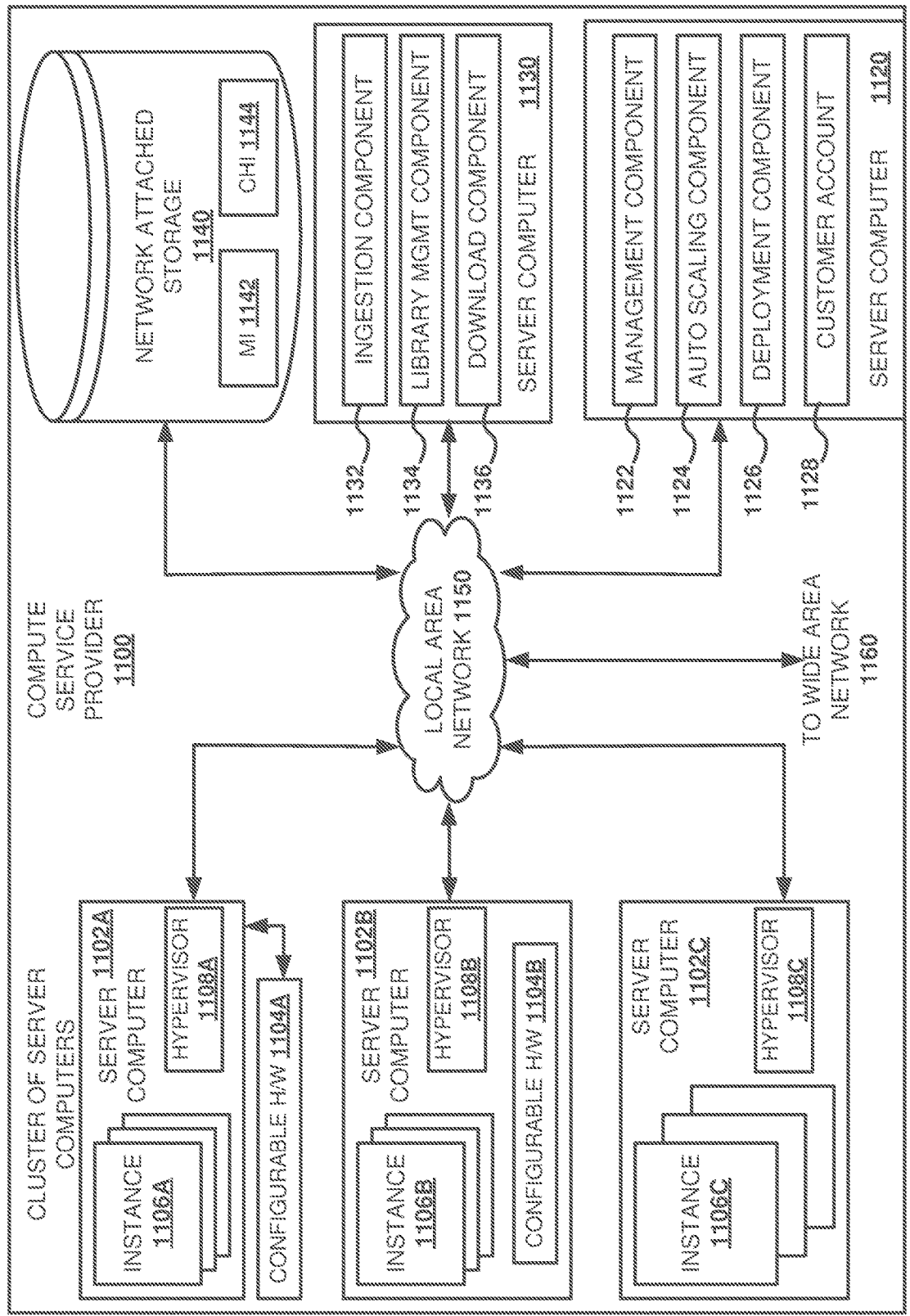
FIG. 11 is an example system diagram illustrating a compute service provider hosting a multi-tenant environment, as can be implemented in certain examples of the disclosed technology.

FIG. 11 is a computing system diagram of a network-based compute service provider 1100 that illustrates one environment in which examples described herein can be used. By way of background, the compute service provider 1100 (e.g., a cloud services provider) is capable of delivery of computing and storage capacity as a service to a community of end recipients. In some examples, the compute service provider can be established for an organization by or on behalf of the organization. That is, the compute service provider 1100 may offer a "private cloud environment." In another example, the compute service provider 1100 supports a multi-tenant environment, wherein a plurality of customers operate independently (e.g., a public cloud environment). Generally speaking, the compute service provider 1100 can provide the following models: Infrastructure as a Service ("IaaS"), Platform as a Service ("PaaS"), and/or Software as a Service ("SaaS"). Other models can be provided. For the IaaS model, the compute service provider 1100 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some examples, end users access the compute service provider 1100 using networked client devices, such as desktop computers, laptops, tablets, smartphones, etc. running web browsers or other lightweight client applications. Those skilled in the art will recognize that the compute service provider 1100 can be described as a "cloud" environment.

The particular illustrated compute service provider 1100 includes a plurality of server computers 1102A-1102C. While only three server computers are shown, any number can be used, and large centers can include thousands of server computers. The server computers 1102A-1102C can provide computing resources for executing software instances 1106A-1106C. In one example, the software instances 1106A-1106C are virtual machines. As known in the art, a virtual machine is an instance of a software implementation of a machine (i.e., a computer) that executes applications like a physical machine. In the example of a virtual machine, each of the servers 1102A-1102C can be configured to execute a hypervisor 1108 or another type of program configured to enable the execution of multiple software instances 1106 on a single server. Additionally, each of the software instances 1106 can be configured to execute one or more applications.

It should be appreciated that although the examples disclosed herein are described primarily in the context of virtual machines, other types of instances can be utilized with the concepts and technologies disclosed herein. For instance, the technologies disclosed herein can be utilized with storage resources, data communications resources, and with other types of computing resources. The examples disclosed herein might also execute all or a portion of an application directly on a computer system without utilizing virtual machine instances.

The server computers 1102A-1102C can include a heterogeneous collection of different hardware resources or instance types. Some of the hardware instance types can include configurable hardware that is at least partially configurable by a user of the compute service provider 1100. One example of an instance type can include the server computer 1102A which is in communication with configurable hardware 1104A. Specifically, the server computer 1102A and the configurable hardware 1104A can communicate over a local interconnect such as PCIe. Another example of an instance type can include the server computer 1102B and configurable hardware 1104B. For example, the configurable logic 1104B can be integrated within a multi-chip module or on the same die as a CPU of the server computer 1102B. Yet another example of an instance type can include the server computer 1102C without any configurable hardware. Thus, hardware instance types with and without configurable logic can be present within the resources of the compute service provider 1100.

One or more server computers 1120 can be reserved for executing software components for managing the operation of the server computers 1102 and the software instances 1106. For example, the server computer 1120 can execute a management component 1122. A customer can access the management component 1122 to configure various aspects of the operation of the software instances 1106 purchased by the customer. For example, the customer can purchase, rent, or lease instances and make changes to the configuration of the software instances. The configuration information for each of the software instances can be stored as a machine image (MI) 1142 on the network-attached storage 1140. Specifically, the MI 1142 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 1142 which is to be loaded on configurable hardware 1104 when the instance is launched. The CHI includes configuration data for programming or configuring at least a portion of the configurable hardware 1104. The MI 1142 and the CHI can be referenced by software using a machine image identifier (MII) and a configurable hardware image identifier (CHIT), respectively. The MII and CHII may uniquely identify their respective images. In some examples, a programmable logic service provider or logic repository service assign an identifying number to the images. In some examples, the identifier may include a hash value generated from other aspects of the image (e.g., an MD5 or SHA hash value of the images).

The customer can also specify settings regarding how the purchased instances are to be scaled in response to demand. The management component can further include a policy document to implement customer policies. An auto scaling component 1124 can scale the instances 1106 based upon rules defined by the customer. In one example, the auto scaling component 1124 allows a customer to specify scale-up rules for use in determining when new instances should be instantiated and scale-down rules for use in determining when existing instances should be terminated. The auto scaling component 1124 can consist of a number of sub-components executing on different server computers 1102 or other computing devices. The auto scaling component 1124 can monitor available computing resources over an internal management network and modify resources available based on need.

A deployment component 1126 can be used to assist customers in the deployment of new instances 1106 of computing resources. The deployment component can have access to account information associated with the instances, such as who is the owner of the account, credit card information, country of the owner, etc. The deployment component 1126 can receive a configuration from a customer that includes data describing how new instances 1106 should be configured. For example, the configuration can specify one or more applications to be installed in new instances 1106, provide scripts and/or other types of code to be executed for configuring new instances 1106, provide cache logic specifying how an application cache should be prepared, and other types of information. The deployment component 1126 can utilize the customer-provided configuration and cache logic to configure, prime, and launch new instances 1106. The configuration, cache logic, and other information may be specified by a customer using the management component 1122 or by providing this information directly to the deployment component 1126. The instance manager can be considered part of the deployment component.

Customer account information 1128 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 1130 can be reserved for executing software components for managing the download of configuration data to configurable hardware 1104 of the server computers 1102. For example, the server computer 1130 can execute a programmable logic service provider and/or a logic repository service comprising an ingestion component 1132, a library management component 1134, and a download component 1136. The ingestion component 1132 can receive host logic and application logic designs or specifications and generate configuration data that can be used to configure the configurable hardware 1104. The library management component 1134 can be used to manage source code, user information, and configuration data associated with the logic repository service. For example, the library management component 1134 can be used to store configuration data generated from a user's design in a location specified by the user on the network-attached storage 1140. In particular, the configuration data can be stored within a configurable hardware image 1142 on the network-attached storage 1140. Additionally, the library management component 1134 can manage the versioning and storage of input files (such as the specifications for the application logic and the host logic) and metadata about the logic designs and/or the users of the logic repository service. The library management component 1134 can index the generated configuration data by one or more properties such as a user identifier, an instance type, a marketplace identifier, a machine image identifier, and a configurable hardware identifier, for example. The download component 1136 can be used to authenticate requests for configuration data and to transmit the configuration data to the requestor when the request is authenticated. For example, agents on the server computers 1102A-B can send requests to the download component 1136 when the instances 1106 are launched that use the configurable hardware 1104. As another example, the agents on the server computers 1102A-B can send requests to the download component 1136 when the instances 1106 request that the configurable hardware 1104 be partially reconfigured while the configurable hardware 1104 is in operation.

The network-attached storage (NAS) 1140 can be used to provide storage space and access to files stored on the NAS 1140. For example, the NAS 1140 can include one or more server computers used for processing requests using a network file sharing protocol, such as Network File System (NFS). The NAS 1140 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 1150. In some examples, the NAS 1140 can be replaced or supplemented with a database system.

The network 1150 can be utilized to interconnect the server computers 1102A-1102C, the server computers 1120 and 1130, and the storage 1140. The network 1150 can be a local area network (LAN) and can be connected to a Wide Area Network (WAN) 1160 so that end users can access the compute service provider 1100. It should be appreciated that the network topology illustrated in FIG. 11 has been simplified and that many more networks and networking devices can be utilized to interconnect the various computing systems disclosed herein.

Figure 12:
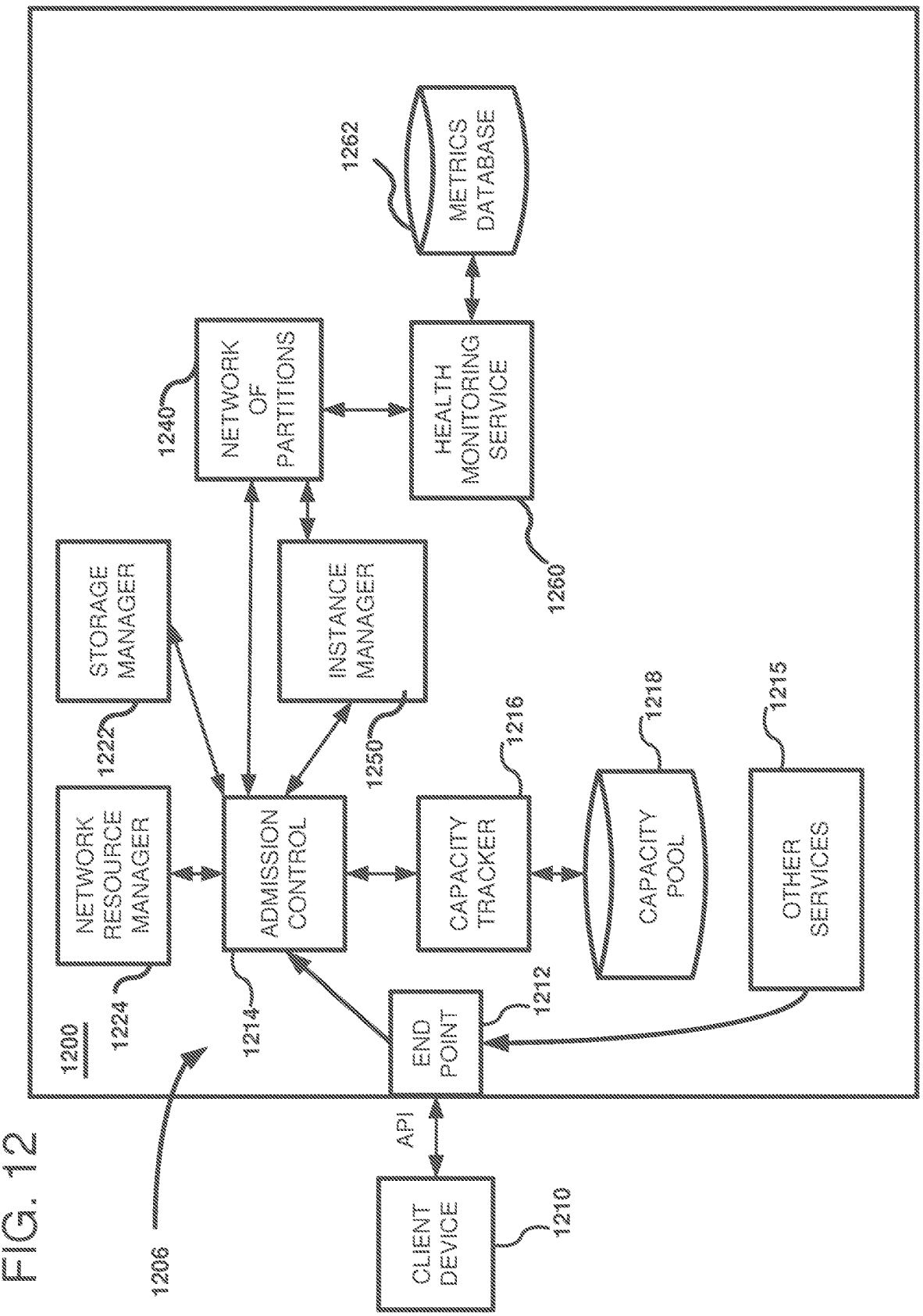
FIG. 12 illustrates management components that can be used in the multi-tenant environment of FIG. 11.

FIG. 12 illustrates in further detail management components 1206 that can be used in the multi-tenant environment of the compute service provider 1100. In order to access and utilize instances (such as instances 1106 of FIG. 11), a client device can be used. The client device 1210 can be any of a variety of computing devices, mobile or otherwise including a cell phone, smartphone, handheld computer, Personal Digital Assistant (PDA), desktop computer, etc. The client device 1210 can communicate with the compute service provider 1100 through an end point 1212, which can be a DNS address designed to receive and process API requests. In particular, the end point 1212 can be a web server configured to expose an API. Using the API requests, a client 1210 can make requests to implement any of the functionality described herein. Other services 1215, which can be internal to the compute service provider 1100, can likewise make API requests to the end point 1212.

Other general management services that may or may not be included in the compute service provider 1100 include an admission control 1214, e.g., one or more computers operating together as an admission control web service. The admission control 1214 can authenticate, validate and unpack the API requests for service or storage of data within the compute service provider 1100. The capacity tracker 1216 is responsible for determining how the servers need to be configured in order to meet the need for the different instance types by managing and configuring physical inventory in terms of forecasting, provisioning, and real-time configuration and allocation of capacity. The capacity tracker 1216 maintains a pool of available inventory in a capacity pool database 1218. The capacity tracker 1216 can also monitor capacity levels so as to know whether resources are readily available or limited. An instance manager 1250 controls launching and termination of instances in the network. When an instruction is received (such as through an API request) to launch an instance, the instance manager pulls resources from the capacity pool 1218 and launches the instance on a decided upon host server computer. Similar to the instance manager are the storage manager 1222 and the network resource manager 1224. The storage manager 1222 relates to initiation and termination of storage volumes, while the network resource manager 1224 relates to initiation and termination of routers, switches, subnets, etc. A network of partitions 1240 is described further in relation to FIG. 13 and includes a physical layer upon which the instances are launched.

A health monitoring service 1260 can provide monitoring for resources and the applications customers run on the compute service provider 1100. System administrators can use the monitoring service 1260 to collect and track metrics, and gain insight to how applications are running. For example, the monitoring service 1260 can allow system-wide visibility into application performance and operational health. Metrics generated by the health monitoring service 1260 can be stored in the metrics database 1262.

Figure 13:
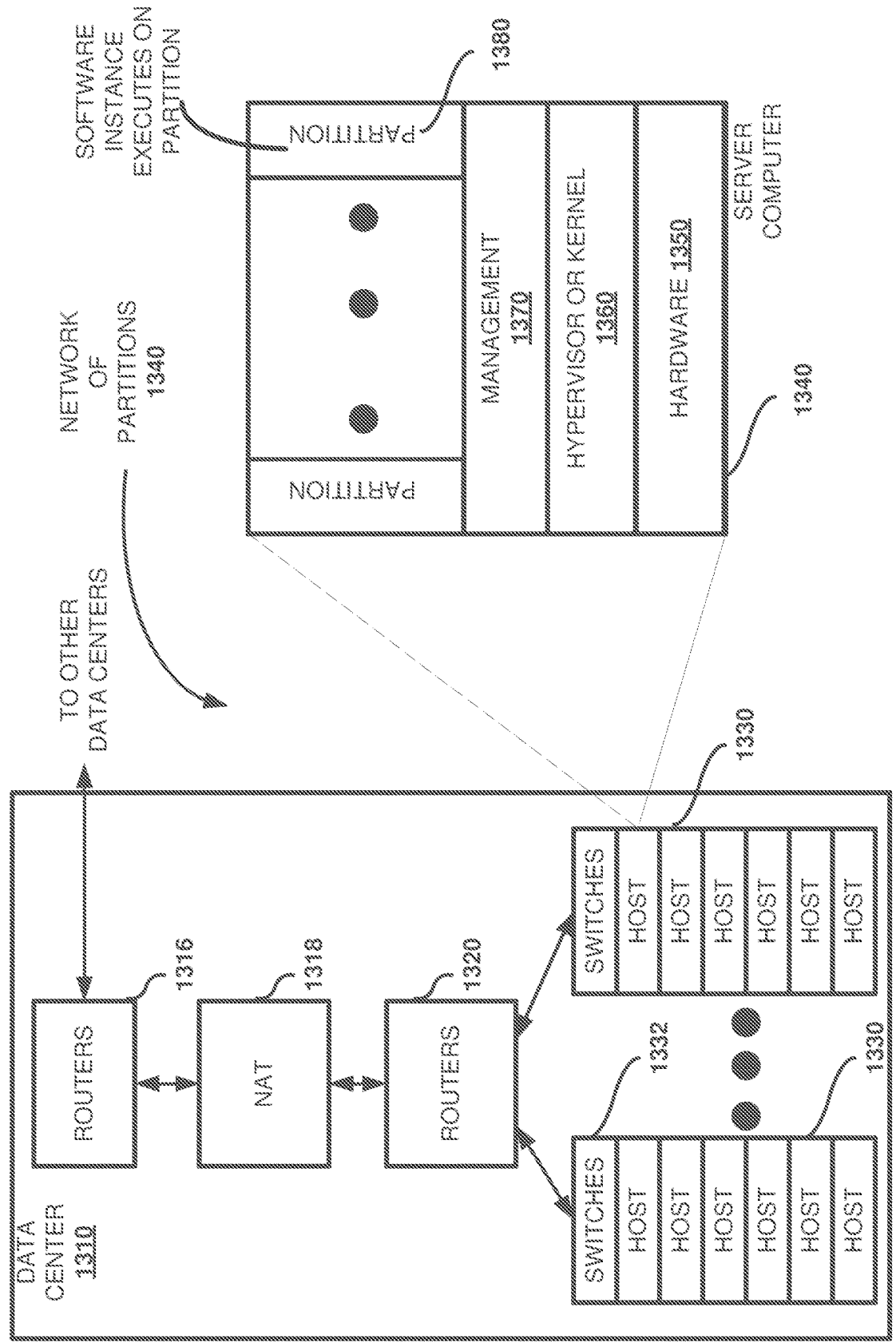
FIG. 13 is an example system diagram showing a plurality of virtual machine instances running in a multi-tenant environment, including a programmable logic service provider.

FIG. 13 illustrates the network of partitions 1240 and the physical hardware associated therewith. The network of partitions 1240 can include a plurality of data centers, such as data center 1310, coupled together by routers 1316. The routers 1316 read address information in a received packet and determine the packet's destination. If the router decides that a different data center contains a host server computer, then the packet is forwarded to that data center. If the packet is addressed to a host in the data center 1310, then it is passed to a network address translator (NAT) 1318 that converts the packet's public IP address to a private IP address. The NAT also translates private addresses to public addresses that are bound outside of the datacenter 1310. Additional routers 1320 can be coupled to the NAT to route packets to one or more racks of host server computers 1330. Each rack 1330 can include a switch 1332 coupled to multiple host server computers. A particular host server computer is shown in an expanded view at 1340.

Each host 1340 has underlying hardware 1350 including one or more CPUs, memory, storage devices, reconfigurable hardware, etc. Running a layer above the hardware 1350 is a hypervisor or kernel layer 1360. The hypervisor or kernel layer can be classified as a type 1 or type 2 hypervisor. A type 1 hypervisor runs directly on the host hardware 1350 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 1370 can be part of the hypervisor or separated therefrom and generally includes device drivers needed for accessing the hardware 1350. The partitions 1380 are logical units of isolation by the hypervisor. Each partition 1380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 1370, which can then pass the metrics to the health monitoring service 1260 for storage in the metrics database 1262. Additionally, the management layer 1370 can pass to the monitoring service 1250 the number of instances that are running, when they were launched, the operating system being used, the applications being run, etc. All such metrics can be used for consumption by the health monitoring service 1260 and stored in database 1262.

Figure 14:
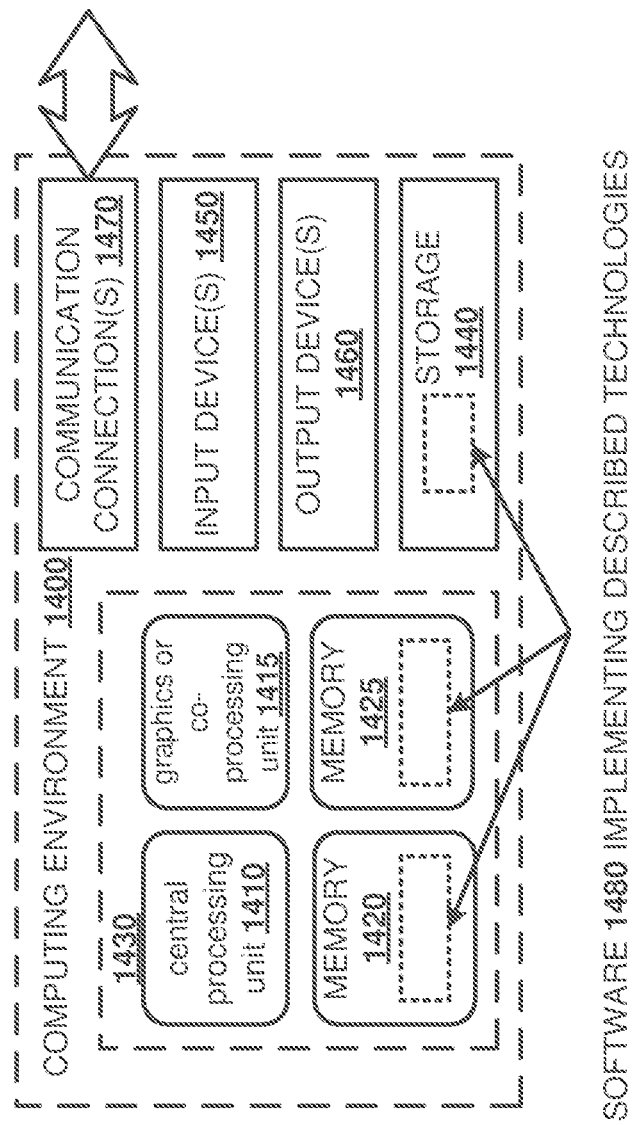
FIG. 14 depicts a generalized example of a suitable computing environment in which certain described innovations can be implemented.

FIG. 14 depicts a generalized example of a suitable computing environment 1400 in which the described innovations may be implemented. The computing environment 1400 is not intended to suggest any limitation as to scope of use or functionality, as the innovations may be implemented in diverse general-purpose or special-purpose computing systems. For example, the computing environment 1400 can be any of a variety of computing devices (e.g., desktop computer, laptop computer, server computer, tablet computer, etc.)

With reference to FIG. 14, the computing environment 1400 includes one or more processing units 1410, 1415 and memory 1420, 1425. In FIG. 14, this basic configuration 1440 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s).

A computing system may have additional features. For example, the computing environment 1400 includes storage 1440, one or more input devices 1450, one or more output devices 1460, and one or more communication connections 1470. An interconnection mechanism (not shown) such as a bus, controller, or network interconnects the components of the computing environment 1400. Typically, operating system software (not shown) provides an operating environment for other software executing in the computing environment 1400, and coordinates activities of the components of the computing environment 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing environment 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing environment 1400. The output device (s) 1460 may be a display, printer, speaker, CD-writer, or another device that provides output from the computing environment 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed examples can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible examples to which the principles of the disclosed technology may be applied, it should be recognized that the illustrated examples are only preferred examples and should not be taken as limiting the scope of the claims. Rather, the scope of the claimed subject matter is defined by the following claims. We therefore claim as our invention all that comes within the scope of these claims.

What is claimed is:

1. A method, comprising:
    via a computer network, receiving a request to create a virtual machine instance comprising a field programmable gate array (FPGA) and a processor configured to execute a supervisor mode process and a user mode process;
    producing configuration data for programming application logic and host logic of the FPGA;
    executing the supervisor mode process and the user mode process with the processor to launch the virtual machine instance, the supervisor mode process being configured to be in communication with the host logic; and
    programming the application logic with the configuration data, the application logic being configured to communicate with the virtual machine instance via the host logic.

2. The method of claim 1, wherein the virtual machine instance communicates with the host logic using a service process executing on the virtual machine instance.

3. The method of claim 1, wherein the request is received from a first party, and wherein the configuration data is received from a third party different from the first party.

4. The method of claim 1, wherein:
    the request comprises an indicator used for launching the virtual machine instance; and
    the producing the configuration data further comprises:
        mapping the indicator to a set of configuration data, and
        selecting configuration data to produce based on the mapping.

5. The method of claim 1, further comprising: generating the configuration data by compiling source code indicated by the request to create a programming file as at least a portion of the configuration data for the FPGA.

6. The method of claim 1, further comprising:
    programming the host logic with the configuration data, including programming the host logic with logic for interfacing between the processor and the application logic.

7. The method of claim 1, wherein the launching the virtual machine instance occurs prior to the producing configuration data.

8. The method of claim 1, wherein: the producing configuration data occurs prior to the launching, the launching comprising performing the programming the FPGA with the produced configuration data prior to providing the virtual machine instance to a requester.

9. The method of claim 8, further comprising, after the providing the virtual machine instance to the requester, partially reconfiguring the FPGA with the produced configuration data.

10. The method of claim 8, wherein after performing the programming the FPGA with the produced configuration data, the virtual machine instance further reprograms a portion, but not all, of the programmed FPGA.

11. The method of claim 1, wherein:
the request comprises an indicator of the configuration data;
the producing the configuration data further comprises authenticating the request to determine whether a user associated with the request is authorized to access the requested configuration data; and
the producing comprises producing the indicated configuration data.

12. The method of claim 11, wherein the indicator is used to locate the configuration data in a networked storage database or storage device.

13. The method of claim 1, wherein the request is received with a network-accessible computer configured to communicate with a server hosting the virtual machine instance via a computer network.

14. A method, comprising:
via a computer network, sending a request to create a virtual machine instance, the virtual machine instance comprising a field programmable gate array (FPGA) and a processor;
via the computer network, sending a request to produce configuration data for programming application logic of the FPGA;
via the computer network, sending a request to launch the virtual machine instance, the virtual machine instance being configured to be in communication with host logic of the FPGA; and
via the computer network, sending a request to program the application logic with the configuration data, the application logic being configured to communicate with the virtual machine instance via the host logic, and the host logic including logic for interfacing between the application logic and the processor to shield the application logic from communicating directly with the processor.

15. The method of claim 14, further comprising:
via the computer network, sending source code files, netlist files, or references to bitstream data used to produce the configuration data.

16. The method of claim 14, further comprising:
via the computer network, sending a request to create a configurable hardware instance.

17. The method of claim 14, wherein the sending the request to launch the virtual machine instance is performed after the sending the request to produce the configuration data.

18. The method of claim 14, wherein the request to create the configurable hardware image comprises a unique image identifier and at least one of the following: requested compatible instance types, the configuration data, access permissions for controlling access to the virtual machine instance.

19. A system, comprising:
a network-accessible computer configured to receive requests to create virtual machine instances comprising at least one field programmable gate array (FPGA); and
compute hosts coupled to the network-accessible computer and comprising execution resources for providing the requested virtual machine instances, the compute hosts comprising at least one processor and the at least one FPGA, and the at least one FPGA including application logic and host logic, wherein:
the network-accessible computer produces configuration data for programming the application logic with the host logic, the application logic being identified at least in part by the received requests,
the network-accessible computer produces configuration data for programming the host logic with logic for interfacing between the at least one processor and the application logic, and
the compute hosts execute computer-executable instructions for a service process that receives commands from the network-accessible computer and performs operations associated with those commands with the host logic or the application logic.

20. The system of claim 19, further comprising:
network-accessible storage storing programming data within the configuration data, the storage being accessible by only supervisor privilege level processes or virtual machines on the network-accessible computer.

21. The system of claim 19, wherein:
the network-accessible computer is hosted on a different physical server than the compute hosts.

22. The system of claim 19, wherein:
the network-accessible computer comprises computer-executable instructions that when executed by a processor, provide logic for managing the at least one FPGA based on the requests.

23. The system of claim 19, wherein:
the compute hosts are further configured to program the at least one FPGA with a supervisor privilege level process or a virtual machine instance; and
the compute hosts are further configured to execute computer-executable code for operating the programmed at least one FPGA with a user privilege level process or another virtual machine instance.

* * * * *